(12) United States Patent
Blacker et al.

(10) Patent No.: US 10,141,594 B2
(45) Date of Patent: Nov. 27, 2018

(54) SYSTEMS AND METHODS FOR ASSEMBLING REDOX FLOW BATTERY REACTOR CELLS

(75) Inventors: Ricky Blacker, White Rock (CA); Gary Lepp, Vancouver (CA)

(73) Assignee: VRB Energy Inc., George Town (KY)

( * ) Notice: Subject to any disclaimer, the term of this patent is extended or adjusted under 35 U.S.C. 154(b) by 685 days.

(21) Appl. No.: 13/269,362

(22) Filed: Oct. 7, 2011

(65) Prior Publication Data
US 2013/0089767 A1    Apr. 11, 2013

(51) Int. Cl.
*H01M 8/18* (2006.01)

(52) U.S. Cl.
CPC ........... *H01M 8/188* (2013.01); *Y02E 60/528* (2013.01); *Y10T 29/49108* (2015.01)

(58) Field of Classification Search
CPC ...................................... H01M 9/20
See application file for complete search history.

(56) References Cited

U.S. PATENT DOCUMENTS

| | | |
|---|---|---|
| 3,279,949 A | 10/1966 | Schaefer et al. |
| 3,530,003 A | 9/1970 | Warszawski et al. |
| 3,666,561 A | 5/1972 | Chiku |
| 3,996,064 A | 12/1976 | Thaller |
| 4,018,508 A | 4/1977 | McDermott et al. |
| 4,181,777 A | 1/1980 | Spaziante |
| 4,287,465 A | 9/1981 | Godard et al. |
| 4,312,735 A | 1/1982 | Grimes et al. |
| 4,362,791 A | 12/1982 | Kaneko et al. |
| 4,371,433 A | 2/1983 | Balko et al. |
| 4,410,606 A | 10/1983 | Loutfy et al. |
| 4,786,567 A | 11/1988 | Skyllas-Kazacos et al. |
| 4,797,566 A | 1/1989 | Nozaki et al. |
| 4,908,281 A | 3/1990 | O'Callaghan |
| 4,927,509 A | 5/1990 | Mathur et al. |
| 4,956,244 A | 9/1990 | Shimizu et al. |
| 5,225,712 A | 7/1993 | Erdman |
| 5,250,158 A | 10/1993 | Kaneko et al. |

(Continued)

FOREIGN PATENT DOCUMENTS

| | | |
|---|---|---|
| AT | 509 888 A4 | 12/2011 |
| AU | 55562/86 A | 8/1987 |

(Continued)

OTHER PUBLICATIONS

Bartolozzi, M., "Development of Redox Flow Batteries. A Historical Bibliography," Journal of Power Sources, 27 (1989), pp. 219/234.

(Continued)

*Primary Examiner* — Jacob B Marks
(74) *Attorney, Agent, or Firm* — Stoel Rives LLP

(57) ABSTRACT

A reactor assembly for a redox flow battery system is disclosed. The reactor assembly may include a plurality of outer frames, a plurality of inner frames, and a rib and channel interlock system integrated in the plurality of outer frames and the plurality of inner frames. In certain embodiments, the rib and channel interlock system may be configured to create a plurality of seal systems enclosing an outer circumference of an electrolyte compartment when the plurality of outer frames and the plurality of inner frames are compressed together in a stack configuration.

20 Claims, 20 Drawing Sheets

(56) References Cited

U.S. PATENT DOCUMENTS

| | | | |
|---|---|---|---|
| 5,308,718 A | 5/1994 | Eidler et al. |
| 5,318,865 A | 6/1994 | Kaneko et al. |
| 5,368,762 A | 11/1994 | Sato et al. |
| 5,484,666 A | 1/1996 | Gibb et al. |
| 5,486,430 A | 1/1996 | Gorbell et al. |
| 5,512,787 A | 4/1996 | Dederick |
| 5,587,132 A | 12/1996 | Nakajima et al. |
| 5,601,943 A | 2/1997 | Eidler et al. |
| 5,656,390 A | 8/1997 | Kageyama et al. |
| 5,665,212 A | 9/1997 | Zhong et al. |
| 5,725,967 A * | 3/1998 | Tuttle ................. 429/185 |
| 5,734,255 A | 3/1998 | Thompson et al. |
| 5,759,711 A | 6/1998 | Miyabayashi et al. |
| 5,851,694 A | 12/1998 | Miyabayashi et al. |
| 6,086,643 A * | 7/2000 | Clark et al. ................. 29/623.2 |
| 6,143,443 A | 11/2000 | Kazacos et al. |
| 6,219,623 B1 | 4/2001 | Wills |
| 6,242,125 B1 | 6/2001 | Eidler et al. |
| 6,261,714 B1 | 7/2001 | Eidler et al. |
| 6,414,653 B1 | 7/2002 | Kobayashi |
| 6,416,653 B1 | 7/2002 | Barben, II et al. |
| 6,461,772 B1 | 10/2002 | Miyake et al. |
| 6,468,688 B2 | 10/2002 | Kazacos et al. |
| 6,475,661 B1 | 11/2002 | Pellegri et al. |
| 6,519,041 B1 | 2/2003 | Berthold |
| 6,524,452 B1 | 2/2003 | Clark et al. |
| 6,544,679 B1 | 4/2003 | Petillo et al. |
| 6,555,267 B1 | 4/2003 | Broman et al. |
| 6,558,833 B2 | 5/2003 | McCoy |
| 6,562,514 B1 | 5/2003 | Kazacos et al. |
| 6,563,234 B2 | 5/2003 | Hasegawa et al. |
| 6,609,081 B1 | 8/2003 | de Varennes et al. |
| 6,613,298 B2 | 9/2003 | Tanaka et al. |
| 6,670,721 B2 | 12/2003 | Lof et al. |
| 6,680,547 B1 | 1/2004 | Dailey |
| 6,761,945 B1 | 7/2004 | Adachi et al. |
| 6,764,789 B1 | 7/2004 | Sekiguchi et al. |
| 6,809,431 B1 | 10/2004 | Schippmann |
| 6,858,953 B2 | 2/2005 | Stahlkopf |
| 6,875,535 B2 | 4/2005 | Ye et al. |
| 6,916,579 B2 | 7/2005 | Gorchkov et al. |
| 7,052,796 B2 | 5/2006 | Sabin et al. |
| 7,061,205 B2 | 6/2006 | Shigematsu et al. |
| 7,078,123 B2 | 7/2006 | Kazacos et al. |
| 7,083,875 B2 | 8/2006 | Lillis et al. |
| 7,181,183 B1 | 2/2007 | Hennessy |
| 7,184,903 B1 | 2/2007 | Williams et al. |
| 7,199,550 B2 | 4/2007 | Tsutsui et al. |
| 7,220,515 B2 | 4/2007 | Ito et al. |
| 7,227,275 B2 | 6/2007 | Hennessy et al. |
| 7,258,947 B2 | 8/2007 | Kubata et al. |
| 7,265,456 B2 | 9/2007 | Hennessy |
| 7,353,083 B2 | 4/2008 | Hennessy |
| 7,361,427 B1 | 4/2008 | Dow et al. |
| 7,389,189 B2 | 6/2008 | Williams et al. |
| 7,517,608 B2 | 4/2009 | Brereton et al. |
| 7,682,728 B2 | 3/2010 | Harper |
| 7,687,193 B2 | 3/2010 | Harper |
| 7,704,634 B2 | 4/2010 | Deguchi et al. |
| 7,740,977 B2 | 6/2010 | Lepp et al. |
| 8,026,013 B2 | 9/2011 | Valensa et al. |
| 8,048,555 B2 | 11/2011 | Darcy et al. |
| 8,277,964 B2 | 10/2012 | Hennessy |
| 8,541,138 B2 | 9/2013 | Kazacos et al. |
| 2001/0028977 A1 | 10/2001 | Kazacos et al. |
| 2003/0087156 A1 | 5/2003 | Broman et al. |
| 2003/0143456 A1 | 7/2003 | Kazacos et al. |
| 2004/0036360 A1 | 2/2004 | McCombs |
| 2004/0044442 A1 | 3/2004 | Bayoumi et al. |
| 2004/0113431 A1 | 6/2004 | Huang |
| 2004/0121204 A1 | 6/2004 | Adelman et al. |
| 2004/0151953 A1 | 8/2004 | Kirk et al. |
| 2004/0158417 A1 | 8/2004 | Bonet |
| 2004/0169493 A1 | 9/2004 | Tsutsui et al. |
| 2004/0172943 A1 | 9/2004 | Buelow et al. |
| 2004/0191623 A1 | 9/2004 | Kubata et al. |
| 2004/0207207 A1 | 10/2004 | Stahlkopf |
| 2004/0241544 A1 | 12/2004 | Nakaishi et al. |
| 2005/0004716 A1 | 1/2005 | Lillis et al. |
| 2005/0012395 A1 | 1/2005 | Eckroad et al. |
| 2005/0074665 A1 | 4/2005 | Spaziante et al. |
| 2005/0077252 A1 | 4/2005 | Shih et al. |
| 2005/0147871 A1 | 7/2005 | Shigematsu et al. |
| 2005/0156432 A1 | 7/2005 | Hennessy |
| 2005/0158614 A1 | 7/2005 | Hennessy |
| 2005/0158615 A1 * | 7/2005 | Samuel et al. .................. 429/81 |
| 2006/0142899 A1 | 6/2006 | Wobben |
| 2006/0171086 A1 | 8/2006 | Hennessy et al. |
| 2006/0273595 A1 | 12/2006 | Avagliano et al. |
| 2007/0001461 A1 | 1/2007 | Hopewell |
| 2007/0035135 A1 | 2/2007 | Yoshida |
| 2007/0072067 A1 | 3/2007 | Symons et al. |
| 2007/0202385 A1 | 8/2007 | Minamiura et al. |
| 2007/0258784 A1 | 11/2007 | Looker |
| 2008/0081247 A1 | 4/2008 | Nakaishi et al. |
| 2008/0182157 A1 | 7/2008 | Visco et al. |
| 2008/0220318 A1 | 9/2008 | Brereton et al. |
| 2008/0241643 A1 | 10/2008 | Lepp et al. |
| 2009/0004536 A1 | 1/2009 | Knauer et al. |
| 2009/0047570 A1 | 2/2009 | Harper |
| 2009/0047571 A1 | 2/2009 | Harper |
| 2009/0311559 A1 | 12/2009 | Levine et al. |
| 2010/0003545 A1 | 1/2010 | Horne et al. |
| 2010/0003586 A1 | 1/2010 | Sahu |
| 2010/0021805 A1 | 1/2010 | Winter |
| 2010/0136455 A1 | 6/2010 | Winter |
| 2011/0115425 A1 | 5/2011 | Olsson |
| 2011/0215645 A1 | 9/2011 | Schomburg et al. |
| 2011/0311896 A1 | 12/2011 | Harper |
| 2012/0217933 A1 | 8/2012 | Abe et al. |
| 2013/0127396 A1 | 5/2013 | Triebel et al. |

FOREIGN PATENT DOCUMENTS

| | | |
|---|---|---|
| AU | WO8905363 | 6/1989 |
| AU | 85862/91 | 10/1991 |
| CA | WO2006089415 A1 | 8/2006 |
| EP | 0 246 649 A1 | 11/1987 |
| EP | 0 517 217 A1 | 12/1992 |
| EP | 0 566 019 A1 | 10/1993 |
| EP | 0814527 A2 | 12/1997 |
| EP | 0 889 571 A2 | 1/1999 |
| EP | 1284513 A1 | 2/2003 |
| EP | 1385226 A1 | 1/2004 |
| EP | 1 536 506 A1 | 6/2005 |
| FR | 2.034.755 | 12/1970 |
| GB | 2030349 A | 4/1980 |
| GB | 2085475 A | 4/1982 |
| JP | 54/138502 | 10/1979 |
| JP | 56/42970 A | 4/1981 |
| JP | 57/9072 A | 1/1982 |
| JP | 57/9073 A | 1/1982 |
| JP | 60/225366 A | 11/1985 |
| JP | 63069151 A | 3/1988 |
| JP | 07153477 A | 12/1993 |
| JP | 7/14617 A | 1/1995 |
| JP | 7/192776 A | 7/1995 |
| JP | 8/7913 A | 1/1996 |
| JP | 8/19179 A | 1/1996 |
| JP | 9283169 A | 10/1997 |
| JP | 11/299106 A | 10/1999 |
| JP | 200317763 | 11/2003 |
| JP | 2004/319341 A | 11/2004 |
| JP | WO2006129635 A1 | 12/2006 |
| WO | WO 89/05528 A1 | 6/1989 |
| WO | WO9003666 A1 | 4/1990 |
| WO | WO 95/12219 A1 | 5/1995 |
| WO | WO9939397 A1 | 8/1999 |
| WO | WO 99/50945 A1 | 10/1999 |
| WO | WO 03/092109 A1 | 11/2003 |
| WO | WO 2004/054065 A1 | 6/2004 |
| WO | WO2006081514 A2 | 8/2006 |
| WO | WO 2008/053317 A1 | 5/2008 |
| WO | WO 2010/118060 A1 | 4/2010 |

(56) References Cited

FOREIGN PATENT DOCUMENTS

| WO | WO 2011/074330 A1 | 6/2011 |
|---|---|---|
| WO | WO 2011/114094 A1 | 9/2011 |
| WO | WO 2011/154306 A2 | 12/2011 |
| WO | WO 2011/154306 A3 | 12/2011 |

OTHER PUBLICATIONS

Sum, et al., "A Study of the V(II)/V(III) Redox Couple for Redox Flow Cell Applications," Journal of power Sources, 15 (1985), pp. 179/190.
Skyllas/Kazacos et al., "Characteristics and performance of 1 kW UNSW vanadium redox battery," Journal of Power Sources, 35 (1991) pp. 399/404.
Skyllas/Kazacos et al., "Vanadium redox battery prototype: design & development," University of New South Wales, Department of Minerals and Energy, Jan. 1991, 254 pgs.
Skyllas/Kazacos et al., "Development of Redox Cell for Remote Area Energy Storage," School of Chemical Engineering & Industrial Chemistry, University of New South Wales, 200 pgs.
Kazacos et al., "Vanadium redox cell electrolyte optimization studies," Journal of Applied Electrochemistry, 1990, 20, pgs. 463/467.
Kazacos, Michael, "Electrolyte Optimization and Electrode Material Evaluation for the Vanadium Redox Battery," a thesis submitted as part of the requirements for the degree of Master of Science, School of Chemical Engineering and Industrial Chemistry, The University of New South Wales, Feb. 1989, 250 pgs.
Definition of "Load" retrieved from Dictionary.com on Aug. 12, 2010.
Definition of "Electrical Power" retrieved from Dictionary.com on Aug. 12, 2010.
Nevins, Sheri et al., Article entitled "Flow Battery Solution for Smart Grid Renewable Energy Applications," Ktech Corporation, 2010 DOE Energy Storage Program Review, Nov. 10, 2010 (14 pgs).
Liu, Galasco, and Savinell, "Enhancing Performance of the Ti(III)/Ti(IV) Couple for Redox Battery Applications," Journal of Electrochemical Society, 1981, downloaded Feb. 6, 2012, pp. 1755/1757.
Chen et al., "Solution Redox Couples for Electrochemical Energy Storage," Journal of Electrochemical Society Energy Storage (128), downloaded Feb. 6, 2012, pp. 1460/1467.
Chen et al., "Solution Redox Couples for Electrochemical Energy Storage," Journal of Electrochemical Society Energy Storage (1982), 129(1), downloaded Feb. 6, 2012, pp. 61/66.
Murthy et al., "Fe(III)/Fe(II)—Ligand Systems for Use as Negative Half/Cells in Redox/Flow Cells," Journal of Power Sources, 1989, 27(2), pp. 119/126.
6001 Chemical Abstract, 1989, No. 22, 111:198495s, printed Feb. 6, 2012, 2 pgs.
Office Action for U.S. Appl. No. 11/234,778 from USPTO dated Sep. 19, 2007, 16 pgs.
Office Action for U.S. Appl. No. 12/975,709 filed Dec. 22, 2010, and mailed from the USPTO dated Oct. 8, 2013, 47 pgs.
International Search Report and Written Opinion for PCT/CA2012/050640 filed Sep. 14, 2012, and dated Dec. 14, 2012, 8 pgs.
Hagedorn, Mark, et al., "NASA Redox Cell Stack Shunt Current, Pumping Power, and Cell Performance Tradeoffs," National Aeronautics and Space Administration, Lewis Research Center, Feb. 1982, 30 pgs.
Hawkins, J.M, et at., "A field of a Vanadium Energy Storage System," INTELC 2001, Oct. 2001, pp. 652-656, Conference Publication No. 484.
"Flow Battery," Flow Battery Solutions, Mar. 15, 2013, <http://www.arbin.com/ products/flow-battery? gclid? CKvNqLXD7bUCFed1Ogod-jcAkQ>.
Office Action dated May 10, 2013, for U.S. Appl. No. 12/820,972, filed Jun. 22, 2010.
Office Action for U.S. Appl. No. 13/332,002, filed Dec. 20, 2011, and mailed from the USPTO dated Jun. 20, 2014, 34 pgs.
Nguyen, Trung and Savinell, Robert F.; "Flow Batteries", The Electrochemical Society Interface; Fall 2010 (3 pgs.).
Norris, Benjamin L.; Lex, Peter; Ball, Greg J.; and Scaini, Vince; "Grid-Connected Solar Energy Storage Using the Zinc-Bromine Flow Battery"; (4 pgs.).
Ponce De Leon, C.; Frias-Ferrer, A.; Gonzalez-Garcia, J.; Szanto, D.A.; and Walsh, F.C.; "Redox Flow Cells for Energy Conversion"; Elsevier B.V. ScienceDirect, Journal of Power Sources 160, 716-732; 2006 (17 pgs.).
Scamman, Daniel P.; Reade, Gavin W.; and Roberts, Edward P.L.; "Numerical Modelling of a Bromide-Polysulphide Redox Flow Battery Part 1: Modelling Approach and Validation for a Pilot-Scale System"; Elsevier B.V. Journal of Power Sources 189, 1120-1230; 2009 (9 pgs.).
Tokuda, Nobuyuki; Kanno, Takashi; Hara, Takushi; Shigematsu, Toshio; Tsutsui, Yasumitsu; Ikeuchi, Atsuo; Itou, Takefumi; and Kumamoto, Takahiro; "Development of a Redox Flow Battery System"; SEI Technical Review, No. 50; Jun. 2000 (7 pgs.).
Premium Power Corporation, North Andover, Massachusetts, United States; Powerblock 150 Specifications; (2 pgs.)
Premium Power Corporation, North Andover, Massachusetts, United States; Product Brochure, "Zinc-Flow 45 Regenerative fuel cell with DC output power, for uninterrupted operation of mission-critical site infrastructure"; (2 pgs.).
ZBB Energy Corporation, Menomonee Falls, Wisconsin, United States; Product Brochure, "The Focus of Advanced Energy Storage Systems"; (8 pgs.).
Premium Power Corporation, North Reading, Massachusetts, United States; Product Brochure, "TransFlow 2000 Utility-Scale Mobile Energy Storage System"; (2 pgs.).
Close, Tullis; "Energy storage—a key technology for global energy sustainability", Journal of Power Sources 100, 2-17, 2001 (16 pgs.)
Shigematsu, T.; Kumamoto T.; Deguchi, H.; and Hara, T.; "Applications of a Vanadium Redox-Flow Batter to Maintain Power Quality", Sumitomo Electric Industries, Ltd., IEEE 2002 (6 pgs.).
Barton, John P. and Infield, David G.; Energy Storage and Its Use with Intermittent Renewable Energy, IEEE Transactions on Energy Conversion, vol. 19, No. 2, Jun. 2004 (8 pgs).
Non-final Office Action for U.S. Appl. No. 13/332,002, filed Dec. 20, 2011, and mailed from the USPTO dated Dec. 19, 2014, 15 pgs.
International Preliminary Report on Patentability for PCT/CA2012/050640 filed Sep. 14, 2012, and date of issuance from the International Bureau dated Apr. 8, 2014, 5 pgs.
Notice of Allowance and Fee(s) Due for U.S. Appl. No. 12/975,709, filed Dec. 22, 2010 and dated Mar. 3, 2014, 12 pgs.
Office Action for U.S. Appl. No. 12/820,972, filed Jun. 22, 2010 and mailed from the USPTO dated Dec. 20, 2012, 22 pgs.
Notice of Allowance and Fee(s) Due for U.S. Appl. No. 13/605,771, filed Sep. 6, 2012, and mailed from the USPTO dated Mar. 5, 2015, 26 pgs.
Notice of Allowance and Fee(s) Due for U.S. Appl. No. 13/332,002, filed Dec. 20, 2011, and mailed from the USPTO dated May 21, 2015, 11 pgs.

* cited by examiner

SYSTEMS AND METHODS FOR ASSEMBLING REDOX FLOW BATTERY REACTOR CELLS

TECHNICAL FIELD

This disclosure relates to redox flow battery systems and, more particularly, to a design for a redox flow battery energy storage system reactor cell.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
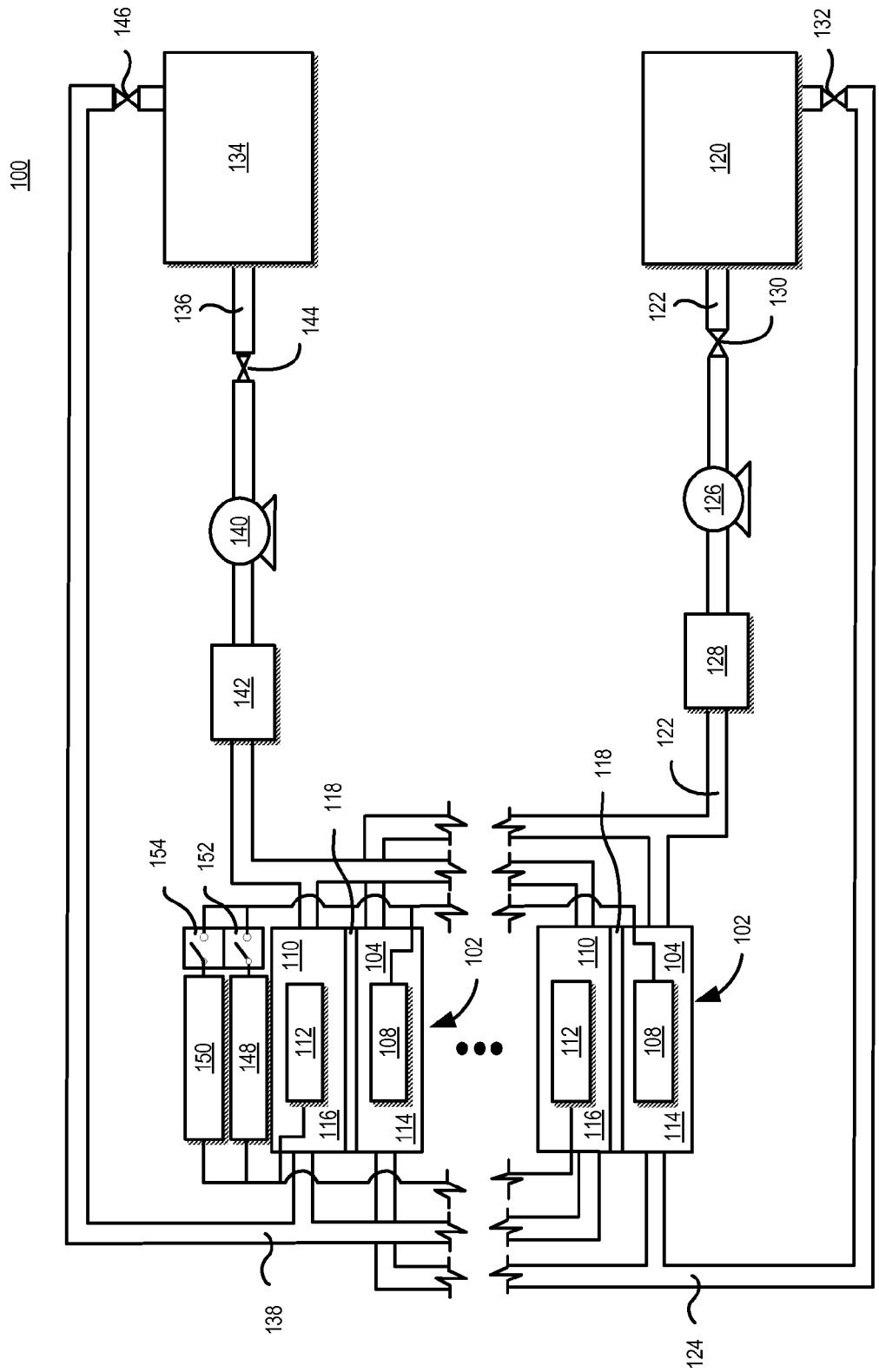
FIG. 1 illustrates a block diagram of a redox battery energy storage system consistent with embodiments disclosed herein.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Energy storage systems such as rechargeable batteries are an important part of electrical power systems, particularly electrical power systems supplied by wind turbine generators, photovoltaic cells, or the like. Energy storage systems may also be utilized to enable energy arbitrage for selling and buying power during off peak conditions, as uninterruptible power sources (UPS), in power quality applications, and to provide backup power. Redox flow battery energy storage systems and, particularly, vanadium redox flow battery energy storage systems (VRB-ESS), may be used in such electrical power systems. A redox flow battery energy storage system may respond quickly to changing loads, as is conventionally required in UPS and power quality applications, and may further be configured to have a large capacity, as is conventionally required in energy arbitrage and backup power applications.

A redox flow battery energy storage system generates electrical power by passing anolyte and catholyte electrolyte solutions through reactor cells. Anolyte and catholyte solutions may be collectively described herein as reactants or reactant electrolytes. A redox flow battery energy storage system may include one or more reactor cells depending on the power demands of the system and, consistent with embodiments disclosed herein, may utilize varying amounts of electrolyte solution based on the energy capacity needs of the system. In certain embodiments, the number and cross-sectional area of the reactors cells within the redox flow battery energy storage system may determine the amount of instantaneous power the system is capable of producing. Further, the volume of anolyte and catholyte electrolytic solutions available to the redox flow battery energy storage system may determine its power storage and production capacity.

FIG. 1 illustrates a block diagram of a redox flow battery energy storage system 100 and, more specifically, a VRB-ESS, consistent with embodiments disclosed herein. The redox flow battery energy storage system 100 may include one or more reactor cells 102 each having a negative compartment 104 with a negative electrode 108 and a positive compartment 110 with a positive electrode 112. The negative compartment 104 may include an anolyte solution 114 in electrical communication with the negative electrode 108. In certain embodiments, the anolyte solution 114 is an electrolyte containing specified redox ions which are in a reduced state and are to be oxidized during the discharge process of a cell 102, or are in an oxidized state and are to be reduced during the charging process of a cell 102, or which are a mixture of these latter reduced ions and ions to be reduced. The positive compartment 110 contains a catholyte solution 116 in electrical communication with the positive electrode 112. The catholyte solution 116 is an electrolyte containing specified redox ions which are in an oxidized state and are to be reduced during the discharge process of a cell 102, or an in a reduced state and are to be oxidized during the charging process of the cell 102, or which are a mixture of these oxidized ions and ions to be oxidized. In certain embodiments, the anolyte and catholyte solutions 114, 116 may be prepared consistent with the disclosure of U.S. Pat. Nos. 4,786,567, 6,143,443, 6,468,688, and 6,562,514, which are herein incorporated by reference in their entireties, or by other known techniques. While the redox flow battery energy storage system illustrated in FIG. 1 is described herein for illustrative purposes as being a Vanadium-based system, other reactant solutions may be utilized.

Each cell 102 of the redox flow battery energy storage system 100 may include an ionically conducting separator 118 (e.g., a membrane) disposed between the negative and positive compartments 104, 110 and in contact with the anolyte and catholyte solutions 114, 116 to provide ionic communication therebetween. In certain embodiments, the separator 118 may serve as a proton exchange membrane.

In some embodiments, additional anolyte solution 114 may be held in an anolyte storage reservoir 120 that is in fluid communication with the negative compartment 104 through an anolyte supply line 122 and an anolyte return line 124. The anolyte storage reservoir 120 may include a tank, bladder, or any other similar storage container. The anolyte supply line 122 may communicate with a pump 126 and a heat exchanger 128. The pump 126 may enable fluid movement of the anolyte solution 114 through the anolyte reservoir 120 supply line 122, negative compartment 104, and return line 124. In some embodiments, the pump 126 may have a variable speed to allow variance in the generated flow rate. The heat exchanger 128 may be configured to transfer heat generated from the anolyte solution 114 to a fluid or gas medium. In some embodiments, the supply line 122 may include one or more supply line valves 130 to control the volumetric flow of the anolyte solution 114. The return line 124 may communicate with one or more return line valves 132 that control the return volumetric flow.

In some embodiments, additional catholyte solution 116 may be held in a catholyte storage reservoir 134 that is in fluid communication with the positive compartment 110 through a catholyte supply line 136 and a catholyte return line 138. The catholyte supply line 136 may communicate with a pump 140 and a heat exchanger 142. The pump 140, which in some embodiments may be a variable speed pump to allow variance in the generated flow rate, may enable fluid movement of the catholyte solution 116 through the catholyte reservoir 134, supply line 136, positive compartment 110, and return line 138. The heat exchanger 142 may be configured to transfer heat generated from the catholyte solution 116 to a fluid or gas medium. In some embodiments, the supply line 136 may include one or more supply line valves 144 to control the volumetric flow of catholyte solution 116. The return line 138 may communicate with one or more return line valves 146 that control the return volumetric flow.

The negative and positive electrodes 108, 112 may be in electrical communication with a power source 148 and a load 150. A power source switch 152 may be disposed in series between the power source 148 and each negative electrode 108. Likewise, a load switch 154 may be disposed in series between the load 150 and each negative electrode 108. Alternative configurations are possible, and the specific configuration of the redox flow battery energy storage system 100 illustrated in FIG. 1 is provided as an exemplary configuration of many possible configurations consistent with embodiments disclosed herein.

While the redox flow battery energy storage system 100 is charging, the power source switch 152 may be closed and the load switch 154 may be opened. Pump 126 may pump the anolyte solution 114 through the negative compartment 104 and anolyte storage reservoir 120 via anolyte supply and return lines 122, 124. Simultaneously, pump 140 may pump the catholyte solution 116 through the positive compartment 110 and catholyte storage reservoir 134 via catholyte supply and return lines 136, 138. Each cell 102 of the redox flow battery energy storage system 100 may be charged by delivering electrical energy from the power source 148 to negative and positive electrodes 108, 112, by, for example, deriving divalent vanadium ions in the anolyte solution 114 and equivalent pentavalent vanadium ions in the catholyte solution 116.

Electricity may be drawn from each reactor cell 102 of the redox flow battery energy storage system 100 by closing load switch 154 and opening power source switch 152. This causes the load 150, which is in electrical communication with negative and positive electrodes 108, 112, to withdraw electrical energy when anolyte and catholyte solution is pumped respectively through the cell 102. In certain embodiments, operation of the various components of the redox flow battery energy storage system 100 may be controlled by an electronic control and monitoring system (not shown). Further, power withdrawn from the redox flow battery energy storage system 100 may be conditioned using power conditioning equipment (not shown) prior to being provided to the load 150. In certain embodiments, a power conversion system (not shown) may also be incorporated to convert DC power output from the reactor cell 102 to AC power required by the load 150.

Figure 2:
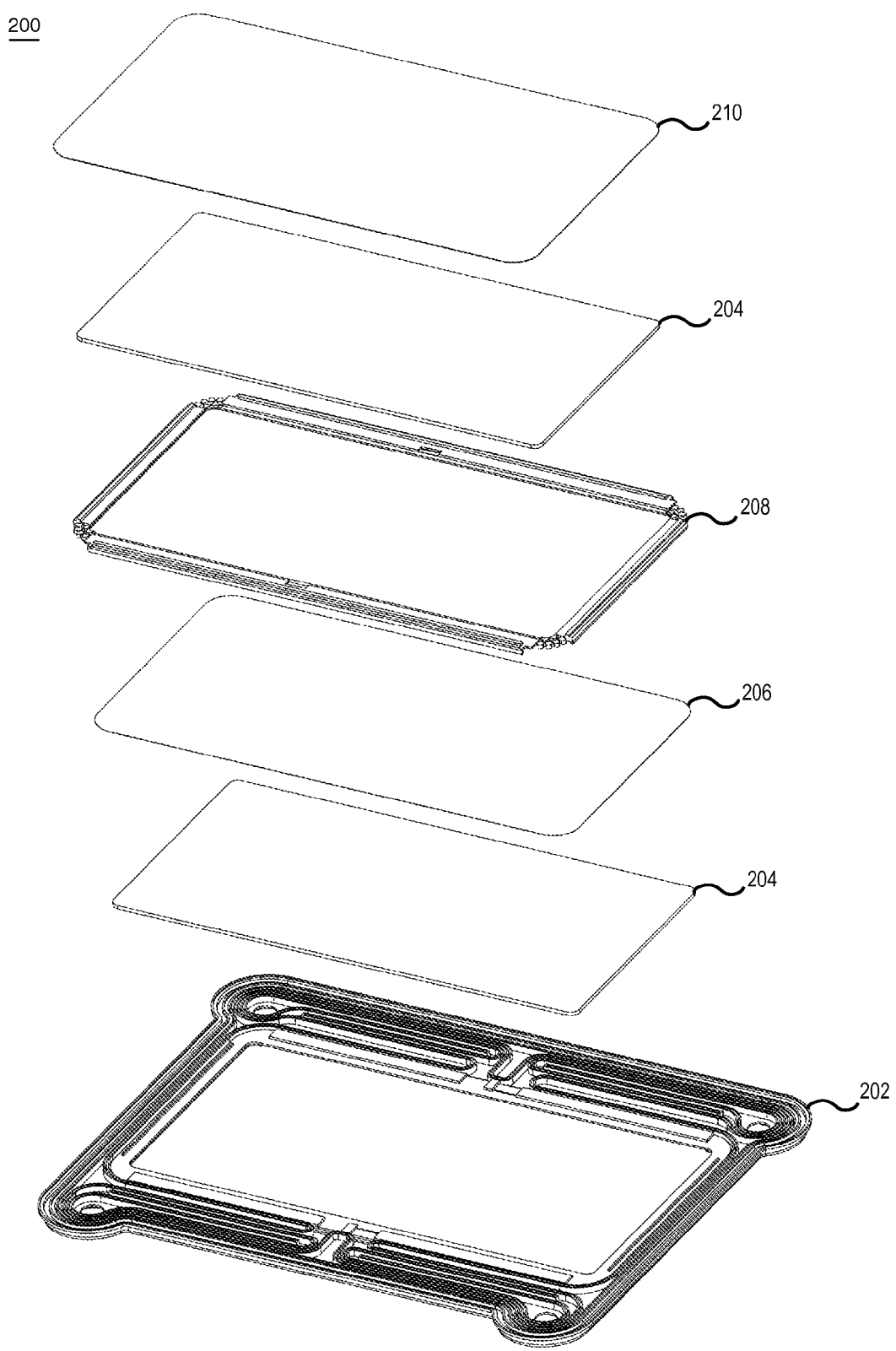
FIG. 2 illustrates an exploded view of a reactor cell assembly of a redox flow battery energy storage system consistent with embodiments disclosed herein.

FIG. 2 illustrates an exploded view of a reactor cell assembly 200 of a redox flow battery energy storage system consistent with embodiments disclosed herein. As illustrated, the reactor stack assembly 200 may comprise an outer frame 202, felt sheets 204, an ionically conducting separator (e.g., membrane) 206, an inner frame 208, and an electrode 210. In certain embodiments, the components 202-210 of the reactor cell assembly 200 may be included in a first level bill of materials. Thus, the reactor cell assembly 200 may be assembled without sub-assembly (i.e., no sub-assembly of components prior to final assembly), allowing for fewer components and a more streamlined manufacturing process.

The reactor cell assembly 200 may be assembled in the order shown in FIG. 2. A felt sheet 204 may be placed within the outer frame 202, thereby creating a permeable compartment (e.g., a negative or positive compartment) between a membrane 206 placed on top of the felt sheet 204 and a bipole of another stack assembly (not shown). The inner frame 208 may then be placed on top of an inside edge of the outer frame 202 and be used to secure the membrane 206 between the outer frame 202 and the inner frame 208. In some embodiments, the outer frame 202 and the inner frame 208 may be coupled using one or more ribs and channels, as described in detail below. A second felt sheet 204 may then be placed on the assembly, defining another permeable compartment (e.g., the negative or positive compartment) between the membrane 206 and an electrode 210 (e.g., an anode or a cathode). In some embodiments, the components 202-210 may be aligned in the reactor cell assembly 200 using guides or other devices integrated into the outer frame 202 and inner frame 208, as described below. In preferred embodiments, the components 202-210 of the reactor cell assembly 200 may be configured to be coupled in series with other reactor cell assemblies, thereby creating a multi-cell redox flow battery energy storage system.

In some embodiments, the outer frame 202 and the inner frame 208 may be comprised of a plastic and/or other polymer material. In certain embodiments, the outer frame 202 and the inner frame 208 may be comprised of a material that does not significantly degrade under the normal operation of the redox flow battery energy storage system. For example, the outer frame 202 and the inner frame 208 may be comprised of a material that does not significantly degrade over time resulting from contact with electrolyte solution.

In certain embodiments, the outer frame 202 and the inner frame 208 may be manufactured using an injection molding process. In some embodiments, the outer frame 202 and the inner frame 208 may be constructed such that the material wall thickness of any part of the frames 202, 208 is substantially similar to enable consistent molding of the frames 202, 208. In certain embodiments, ribs and channels integrated in the outer frame 202 and/or the inner frame 208 may be configured to interlock when the outer frame 202 is coupled with the inner frame 208. By interlocking ribs and channels integrated in the outer frame 202 and/or the inner frame 208, thicker and/or structural frame portions may be created. In certain embodiments, the outer frame 202 and/or inner frame 208 may comprise polypropylene, polyethylene, polyvinyl chloride and/or other like materials. In further embodiments, the outer frame 202 and/or the inner frame 208 may be manufactured using a machining process.

The felt sheets 204 may be configured to define compartments (e.g., negative or positive compartments) in the reactor cell assembly 200 that are permeable by electrolyte solutions (e.g., anolyte and/or catholyte solutions). The felt sheets 204 may be further configured to provide a conductive path between bipole electrodes (e.g., electrode 210) and electrolyte solution. In some embodiments, the felt sheets 204 may comprise a plurality of conductive fibers. In certain embodiments, when saturated with electrolyte solution, the felt sheets 204 may allow for a uniform flow of electrolyte solution through the cell compartments they define. The felt sheets 204 may comprise, for examples, materials that include graphite and/or carbon fibers.

The membrane 206 may be an ionically conducting separator configured to provide ionic communication between anolyte and catholyte electrolyte solutions disposed on each side of the membrane 206. In certain embodiments, the membrane 206 may be configured as a proton exchange membrane. Further, in some embodiments, the membrane 206 may be configured to prevent the mixing of electrolyte solutions (e.g., anolyte and catholyte solutions) disposed on either side of the membrane 206.

The electrode 210 may be configured to provide a conductive path between each cell in a stacked assembly. In some embodiments, the electrode 210 may be comprised of a conductive metallic material. Further, the electrode 210 may be configured to prevent the mixing of electrolyte solutions disposed on either side of the electrode 210 between cells. In certain embodiments, the electrode 210 may be comprised of graphite and/or carbon powder, fibers, and/or flakes bonded with a polymer material designed to not degrade significantly when exposed to the electrolyte solution. In some embodiments, the polymer material may comprise ethylene tetrafluoroethylene, polytetrafluoroethylene, polyvinyl chloride, polypropylene, epoxy, and/or other similar materials.

Figure 3:
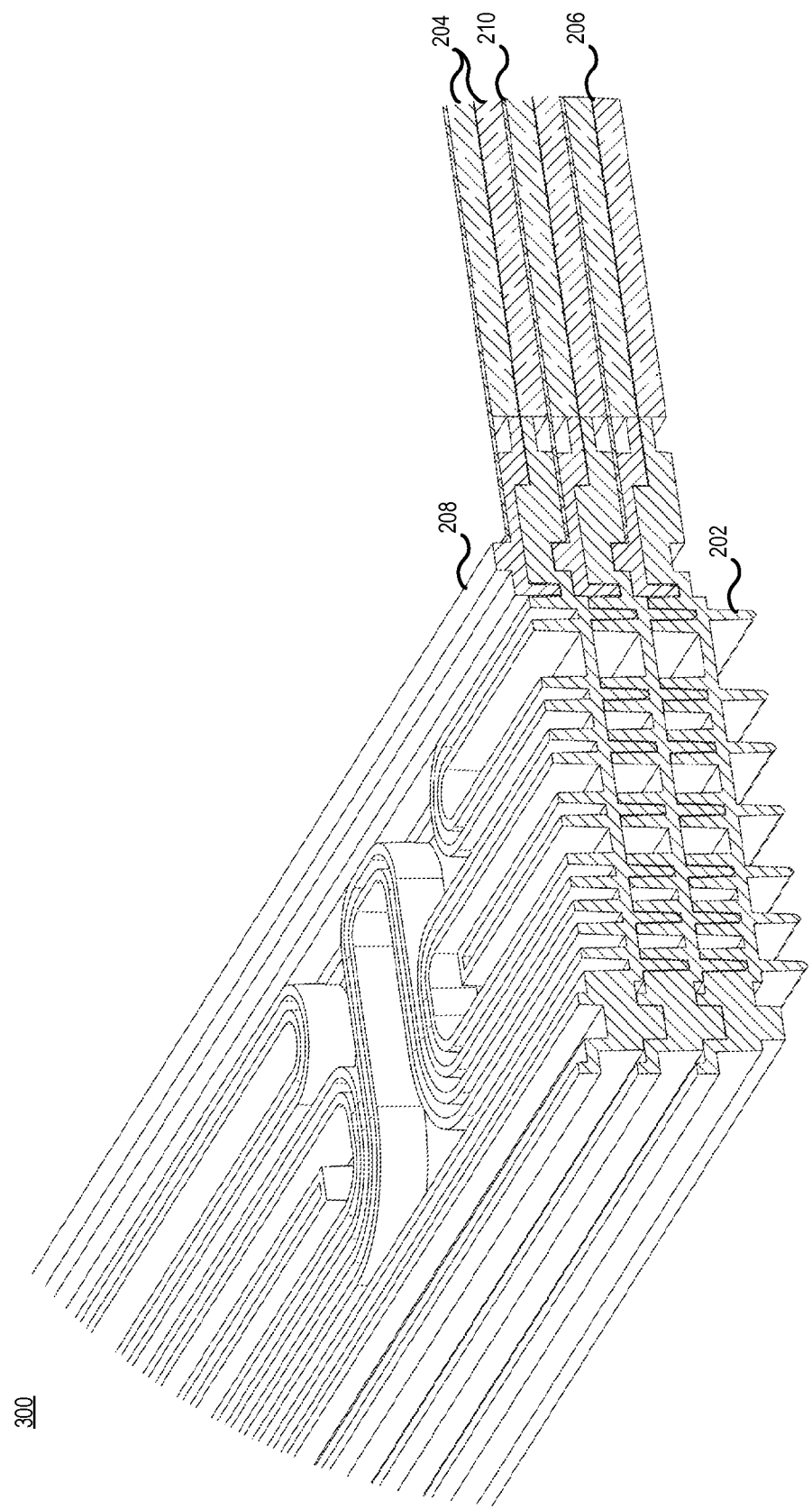
FIG. 3 illustrates a plurality of reactor stack cells consistent with embodiments disclosed herein.

FIG. 3 illustrates a plurality of reactor stack cells 300 consistent with embodiments disclosed herein. As discussed above, in preferred embodiments, the components 202-210 of the reactor cell assembly 200 illustrated in FIG. 2 may be configured to be coupled in series with other reactor cell assemblies. In this manner, as shown in FIG. 3, individual reactor cell assemblies 200 comprising an outer frame 202, a felt sheet 204, a membrane 206, an inner frame 208, another felt sheet 204, and an electrode 210 may be stacked in series with any number of other reactor cell assemblies to form a multi-cell stack.

In some embodiments, the outer frames 202 and the inner frames 208 may be coupled using one or more rib and channel connections integrated in the frames 202, 208, thereby securing other components of the stack assembly (e.g., felt sheets 204, membranes 206, and electrodes 210) within the frames 202, 208. Rib and channel connections integrated in the frames 202, 208 may further function to align the components 202-210 of the reactor cell assemblies 200 included in the reactor stack cells 300. In certain embodiments, utilizing rib and channel connections may also allow the reactor stack cells 300 to be securely coupled using a mechanical clamping system (not shown) or other mechanical means rather than using adhesives between the frames 202, 208. Utilizing a mechanical clamping system may, in some embodiments, allow for streamlined manufacturing of the reactor stack cells 300 and reduce manufacturing time associated with adhesive curing.

Figure 4:
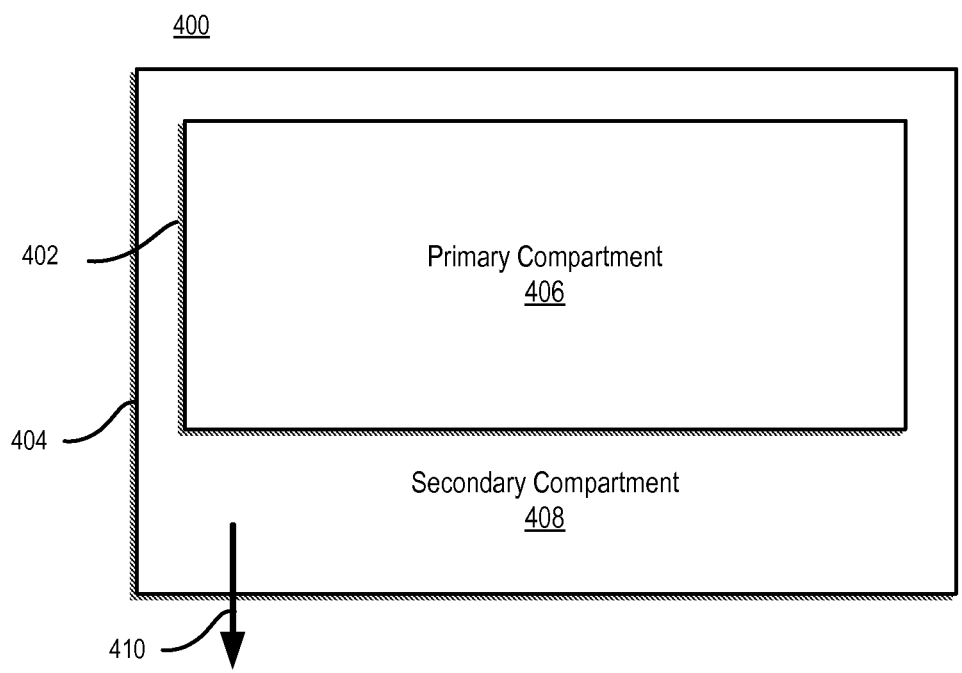
FIG. 4 illustrates a block diagram of a multiple seal system consistent with embodiments disclosed herein.

FIG. 4 illustrates a block diagram of a multiple seal system 400 consistent with embodiments disclosed herein. In some embodiments, the illustrated seal system 400 may be integrated into the outer frame 202 and/or the inner frame 208 and be used to substantially confine electrolyte solution within a negative and/or positive compartment of a reactor cell assembly 200. That is, the illustrated seal system 400 may be utilized to prevent external leaking of electrolyte solution from a reactor cell assembly.

As shown, the seal system 400 may include a primary seal 402 enclosing a primary compartment 406 which, consistent with embodiments disclosed herein, may contain electrolyte solution (e.g., anolyte or catholyte solution) and function as a negative or positive compartment of a reactor cell. In certain embodiments, this primary compartment 406 may be at a higher pressure than surrounding compartments and/or external atmospheric pressure. Accordingly, the primary seal 402 may be a high pressure seal configured to contain electrolyte solution at high pressures. In some embodiments, the higher pressure may be attributable to electrolyte solution being pumped through the primary compartment 406 during operation of the redox flow battery energy storage system. Electrolyte solution may be pumped into the primary compartment 406 via one or more electrolyte inlet manifolds (not shown). Similarly, electrolyte solution may be pumped out of the primary compartment 406 via one or more electrolyte solution outlet manifolds (not shown).

A secondary seal 404 may enclose the primary seal 402, thereby creating a secondary compartment 408 between the primary seal 402 and the secondary seal 404. In some embodiments, the secondary seal 404 may be configured to capture electrolyte solution that leaks through the primary seal 402 and store the leaked electrolyte solution in the secondary compartment 408. In this manner, the secondary compartment 408 can function as a "drip tray" for any leaks from the primary seal 402. In certain embodiments, the secondary compartment 408 may be configured to capture an amount of electrolyte solution corresponding to several leaked drops of electrolyte solution per day over a long period (e.g., a 12-month period).

In further embodiments, the secondary compartment 408 may be at a lower pressure than the primary compartment 406, thereby reducing the likelihood that electrolyte solution will leak through the secondary seal 404. In some embodiments, the secondary compartment 408 may be at an ambient or external atmospheric pressure.

A selectively-closable access port 410 may be integrated into the secondary seal 404 providing external access to the secondary compartment 408. In some embodiments, the access port 410 may allow access to electrolyte solution that has leaked through the primary seal 402 into the secondary compartment 408 via a valve system or the like. Through the access port 410, this leaked electrolyte solution may be removed (i.e., drained) from the secondary compartment 408 and disposed of. Alternatively, leaked electrolyte solution removed from the secondary compartment 408 via the access port 410 may be recycled and reintroduced to the redox flow battery energy storage system.

A rib and channel interlock design may be used to form the primary seal 402, the secondary seal 404, and/or other structures included in the reactor cell assembly 200. Further, as discussed above, rib and channel interlocks integrated into the outer frame 202 and the inner frame 208 may be used to mechanically couple reactor cell assemblies 200 in conjunction with a mechanical clamping system, to create thicker and/or structural frame portions, and to align the components 202-210 of the reactor cell assemblies 200 during assembly.

A rib and channel interlock system may comprise a channel formed by two channel ribs integrated into a first frame portion (e.g., the outer frame 202 and/or the inner frame 208) and a sealing rib integrated into a second frame portion (e.g., the outer frame 202 and/or the inner frame 208). The sealing rib may be disposed within the channel formed by the two channel ribs and, when force (e.g., 300 KN) is applied to the first frame portion including the sealing rib compressing the first frame portion against the second frame portion including the channel ribs, may be secured within the channel. In certain embodiments, securing the sealing rib between the channel ribs may support the sealing rib and reduce the likelihood that the sealing rib will buckle when compressed into the channel. Further, the channel ribs may support the sealing rib and prevent the sealing rib from being over-compressed into the channel. The sealing rib may include a tip that, when pressed against the bottom of the channel formed by the channel ribs, forms a seal that may substantially prevent electrolyte solution from passing through the seal.

Figure 5:
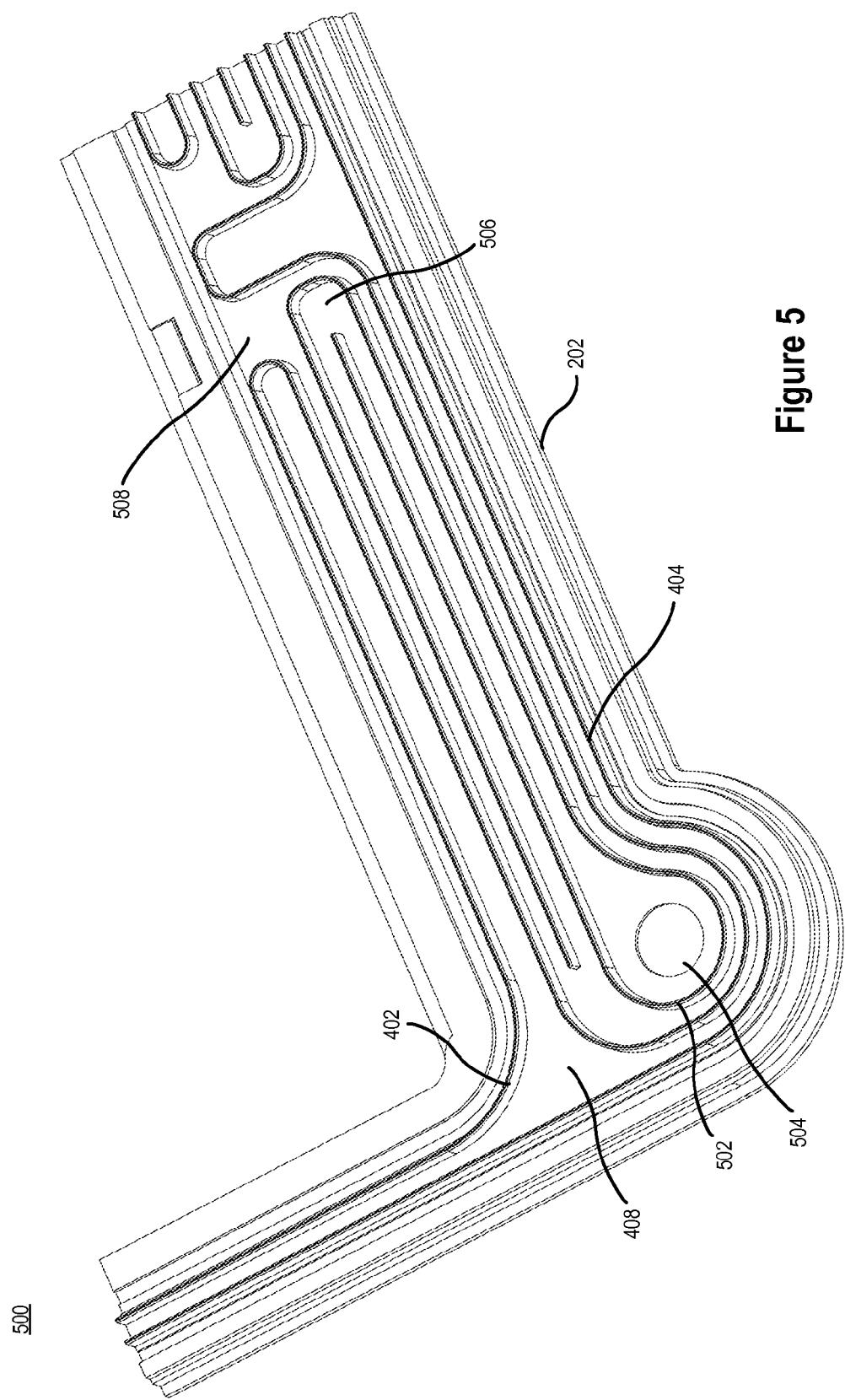
FIG. 5 illustrates a top perspective view of a portion of an outer frame of a reactor stack including integrated seals consistent with embodiments disclosed herein.

FIG. 5 illustrates a top perspective view of a portion 500 of an outer frame 202 of a reactor stack including integrated seals 402, 404, 502 consistent with embodiments disclosed herein. As discussed above, the outer frame 202 may include a primary seal 402 configured to enclose a primary compartment (e.g., negative or positive compartment) of a reactor cell containing electrolyte solution (e.g., anolyte or catholyte solution). In certain embodiments, a primary seal 402 may be formed when two frame portions are coupled using a rib and channel interlock design.

Electrolyte solution may be pumped into the primary compartment via one or more electrolyte inlet manifolds 504. Similarly, electrolyte solution may be pumped out of the primary compartment via one or more electrolyte solution outlet manifolds (not shown). The primary seal 402 may be configured to surround and/or isolate the inlet manifolds 504 and/or outlet manifolds. Further, the primary seal 402 may define an inlet channel 508 running from an inlet manifold to the primary compartment, enabling electrolyte solution to be pumped into the primary compartment at one or more specific locations. Similarly, the primary seal 402 may define an outlet channel running from an outlet manifold to the primary compartment, enabling electrolyte solution to be pumped out of the primary compartment at one or more specific locations.

In some embodiments, the outer frame 202 may further include a secondary seal 404 configured to enclose the primary seal 402 and create a secondary compartment 408 between the primary seal 402 and the secondary seal 404. In certain embodiments, a secondary seal 404 may be formed when two frame portions are coupled using a rib and channel interlock design. In some embodiments, the secondary seal 404 may be configured to capture electrolyte solution that leaks through the primary seal 402 and store the leaked electrolyte solution in the secondary compartment 408. Electrolyte solution contained in the secondary compartment 408 may be removed for disposal and/or recycling back into the system via an access port (not shown). In certain embodiments, the secondary compartment 408 may be at a lower pressure than the primary compartment, thereby reducing the likelihood that electrolyte solution will leak through the secondary seal 404.

A shunt channel 506 may be defined by one or more shunt channel seals 502 integrated in the outer frame 202. A shunt channel seal 502 may be formed when two frame portions are coupled using a rib and channel interlock design. In certain embodiments, the shunt channel 506 may be designed to increase the electrical resistance between cells of the reactor cell assembly by increasing its length and/or decreasing its flow-cross section. In this manner, the shunt channel 506 may reduce shunt electrical currents flowing between reactor cells. In some embodiments, by integrating the shunt channel seals 502 independent of the primary seal 402, the integrity of the primary seal 402 may be increased.

Figure 6:
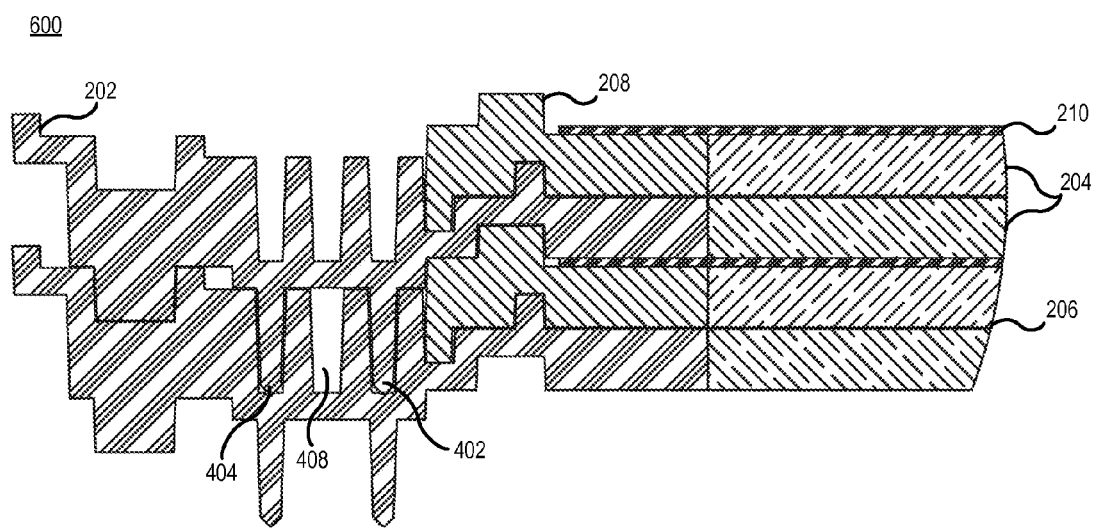
FIG. 6 illustrates a cross-sectional view of a plurality of reactor stack cells including integrated seals consistent with embodiments disclosed herein.

FIG. 6 illustrates a cross-sectional view 600 of a plurality of reactor stack cells including integrated seals 402, 404 consistent with embodiments disclosed herein. As shown, individual reactor cell assemblies comprising an outer frame 202, a felt sheet 204, a membrane 206, an inner frame 208, another felt sheet 204, and an electrode 210 may be stacked in parallel with any number of other reactor cell assemblies to form a multi-cell stack. The outer frame 202 may include a primary seal 402 configured to enclose a primary compartment (e.g., negative or positive compartment) that, in some embodiments, may be filed with a permeable felt sheet 204 of a reactor cell containing electrolyte solution (e.g., anolyte or catholyte solution). As shown, a primary seal 402 may be formed when two frame portions are coupled using a rib and channel interlock design.

The outer frame 202 may further include a secondary seal 404 that encloses the primary seal 402, thereby creating a secondary compartment 408 between the primary seal 402 and the secondary seal 404. In certain embodiments, the secondary compartment 408 may be configured to capture electrolyte solution that leaks through the primary seal 402. Electrolyte solution contained in the secondary compartment 408 may be removed for disposal and/or recycling back into the system via an access port (not shown). As shown, a secondary seal 404 may be formed when two frame portions are coupled using a rib and channel interlock design.

Figure 7:
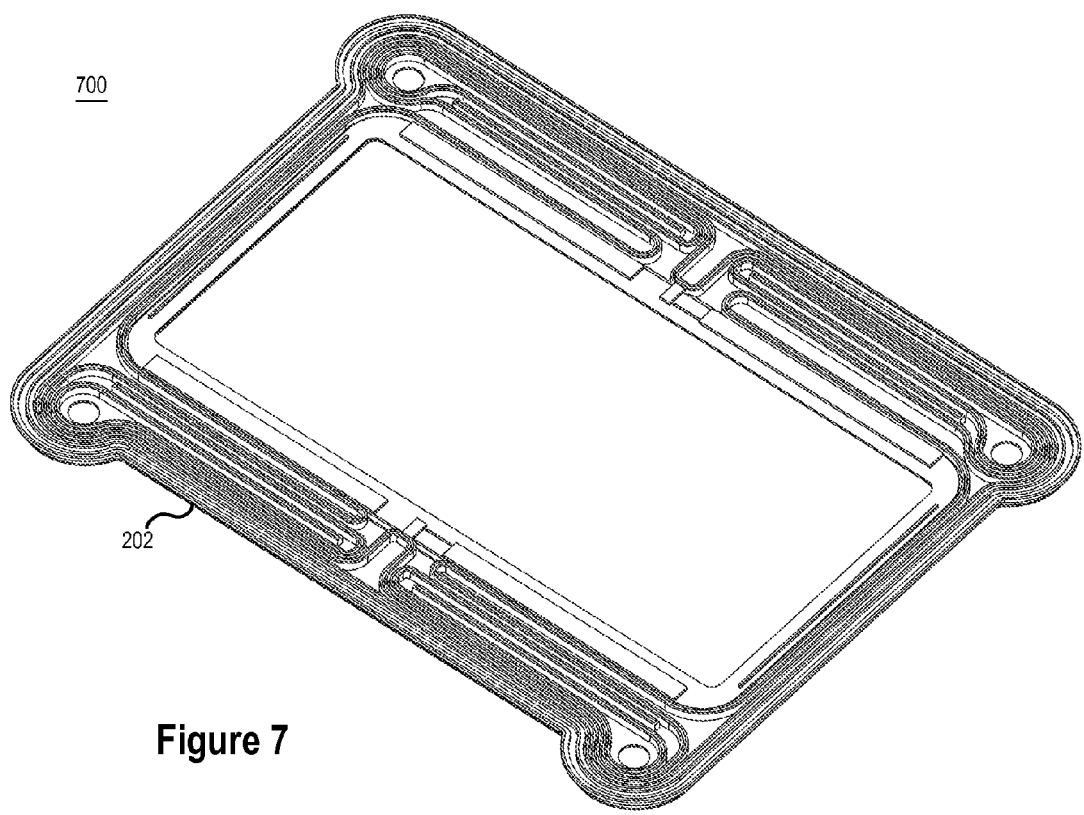
FIG. 7 illustrates a top perspective view of an outer frame of a reactor stack cell including an inner o-ring channel consistent with embodiments disclosed herein.

FIG. 7 illustrates a top perspective view 700 of an outer frame 202 of a reactor stack cell including an inner o-ring channel consistent with embodiments disclosed herein. In certain embodiments, the inner o-ring channel, illustrated in more detail in FIG. 8, may be integrated into the outer frame 202 and used in conjunction with an appropriately sized o-ring (e.g., a rubber o-ring or the like) to seal a terminal outer frame 202 of a multi-cell reactor stack assembly (e.g., reactor stack cells 300) against a rigid structural enclosure. In this manner, the inner o-ring channel may be used in conjunction with an o-ring to create an external seal against a rigid enclosure placed on the terminal ends of a multi-cell reactor stack assembly included in a redox flow battery energy storage system. In certain embodiments, the inner o-ring channel may be used in conjunction with an o-ring to seal a terminal frame at an end of a multi-cell reactor stack that receives and/or provides electrolyte solution from/to storage reservoirs (i.e., an inlet/outlet and/or feed end).

Figure 8:
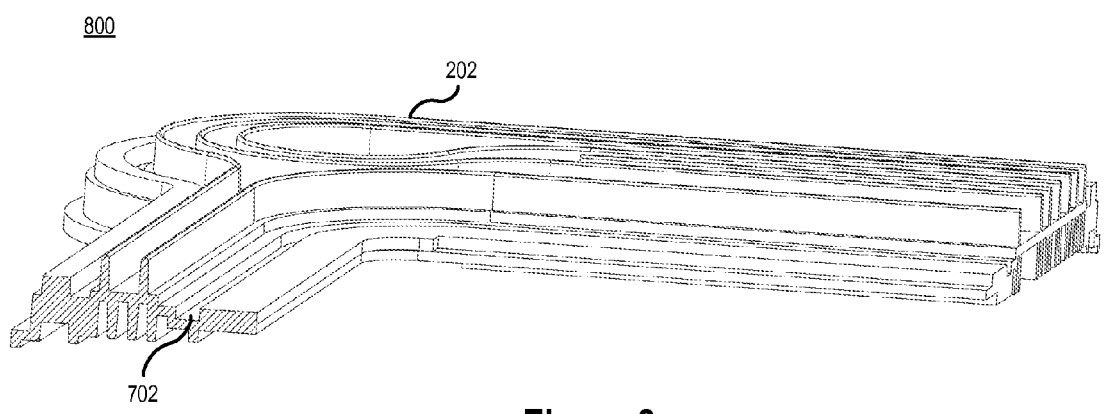
FIG. 8 illustrates a cross-sectional view of an outer frame of a reactor stack cell including an inner o-ring channel consistent with embodiments disclosed herein.

FIG. 8 illustrates a cross-sectional view 800 of an outer frame 202 of a reactor stack cell including an inner o-ring channel 702 consistent with embodiments disclosed herein. As shown, the inner o-ring channel 702 may define a channel that encloses the inner periphery of the outer frame 202 configured to retain and/or secure an appropriately sized o-ring. In certain embodiments, the o-ring may be sized such that when a rigid frame is pressed against the o-ring in the inner o-ring channel 702, a seal is created that substantially contains electrolyte solution at pumping pressures.

Figure 9:
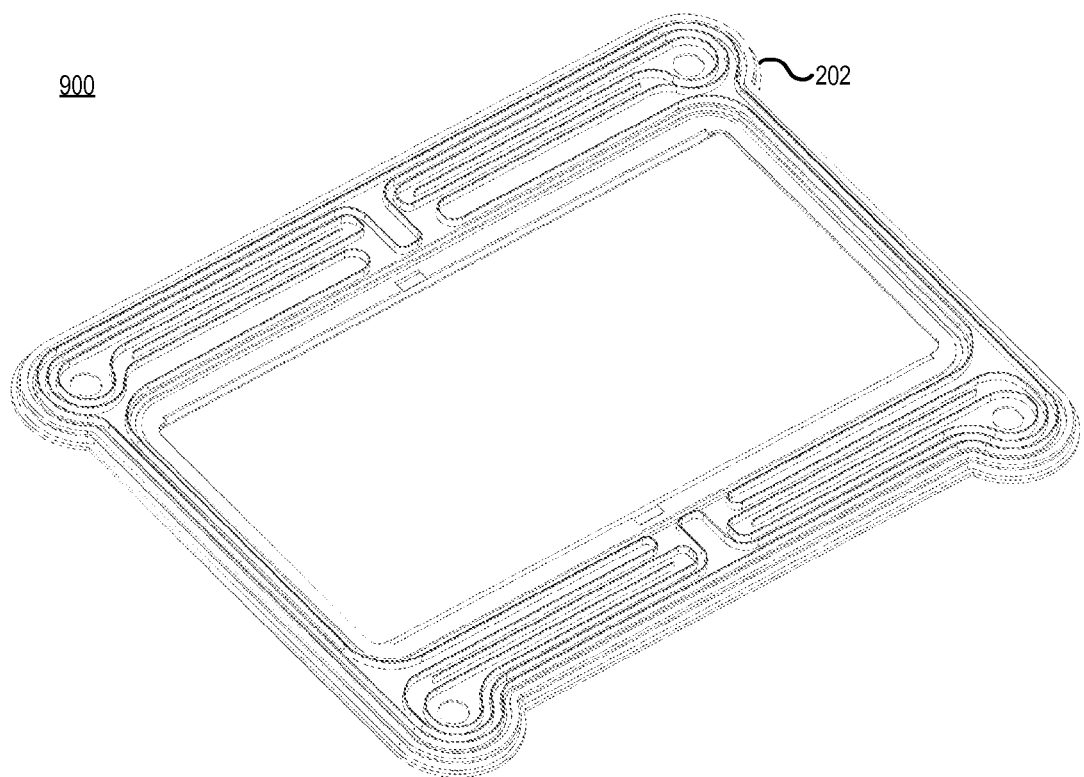
FIG. 9 illustrates a bottom perspective view of an outer frame of a reactor stack cell including an outer o-ring channel consistent with embodiments disclosed herein.

FIG. 9 illustrates a bottom perspective view 900 of an outer frame 202 of a reactor stack cell including an outer o-ring channel consistent with embodiments disclosed herein. In certain embodiments, the outer o-ring channel, illustrated in more detail in FIG. 10, may be integrated into the outer frame 202 and used in conjunction with an appropriately sized o-ring (e.g., a rubber o-ring or the like) to seal a terminal outer frame 202 of a multi-cell reactor stack assembly (e.g., reactor stack cells 300) against a rigid structural enclosure. In this manner, the outer o-ring channel 902 may be used in conjunction with an o-ring to create an external seal against a rigid enclosure placed on the terminal ends of a multi-cell reactor stack assembly included in a redox flow battery energy storage system. In certain embodiments, the outer o-ring channel 902 may be used in conjunction with an o-ring to seal a terminal frame at an end of a multi-cell reactor stack.

Figure 10:
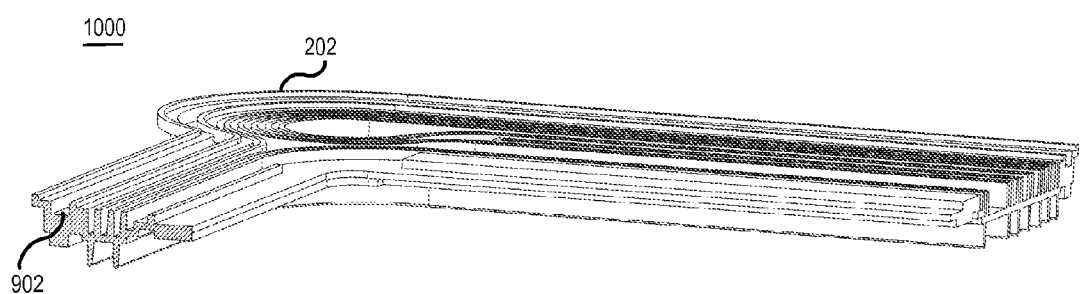
FIG. 10 illustrates a cross-sectional view of an outer frame of a reactor stack cell including an outer o-ring channel consistent with embodiments disclosed herein.

FIG. 10 illustrates a cross-sectional view 1000 of an outer frame 202 of a reactor stack cell including an outer o-ring channel 902 consistent with embodiments disclosed herein. As shown, the outer o-ring channel 902 may define a channel that encloses the outer periphery of the outer frame 202 configured to retain and/or secure an appropriately sized o-ring. In certain embodiments, the o-ring may be sized such that when a rigid frame is pressed against the o-ring in the outer o-ring channel 902, a seal is created that substantially contains electrolyte solution at pumping pressures.

Figure 11:
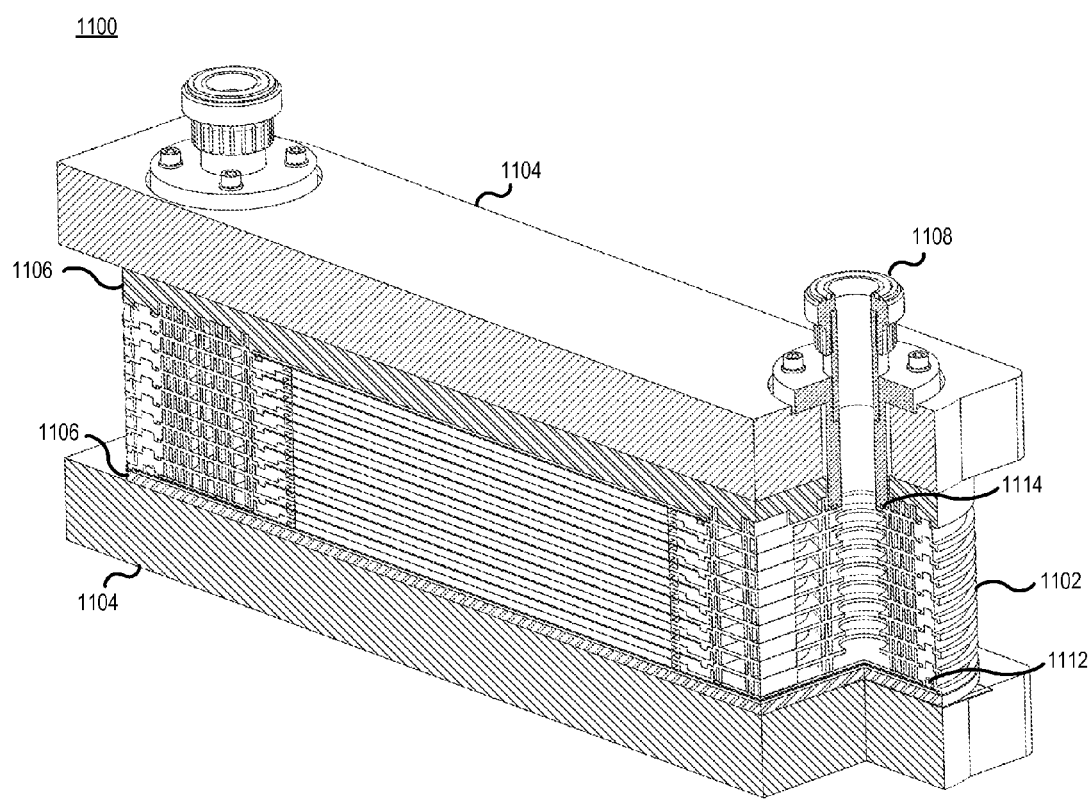
FIG. 11 illustrates a cross-sectional view of an assembled flow cell battery including a plurality of reactor cells consistent with embodiments disclosed herein.

FIG. 11 illustrates a cross-sectional view of an assembled flow cell battery 1100 including a plurality of reactor cells 1102 consistent with embodiments disclosed herein. The plurality of reactor cells 1102 may include several reactor cell assemblies (i.e., reactor cell assembly 200 illustrated in FIG. 2), each including components 202-210, coupled in series. Thus, individual reactor cell assemblies comprising an outer frame 202, a felt sheet 204, a membrane 206, an inner frame 208, another felt sheet 204, and an electrode 210 may be stacked in series with other reactor cell assemblies to form a multi-cell stack including a plurality of reactor cells 1102.

The plurality of reactor cells 1102 may be secured together using a mechanical clamping system (not shown) in conjunction with one or more rigid structural end plates 1104. As shown, the end plates 1104 may be placed on each end of the plurality of reactor cells 1102 and may function to secure, align, and retain the plurality of reactor cells 1102. When used in conjunction with a mechanical clamping system, the end plates 1104 may function to create seals and other structural frame portions using rib and channel interlocks integrated into the outer frames 202 and the inner frames 208 in the plurality of reactor cells 1102.

Rigid isolators 1106 may be included between the rigid structural end plates 1104 and the plurality of reactor cells 1102 in the assembled flow cell battery 1100. The rigid isolators 1106 may be configured to provide a planar surface for the end plates 1104 to interface with outer frames 202 and/or the inner frames 208 of the terminal cell assemblies of the plurality of reactor cells 1102, thereby allowing uniform compression across the outer frames 202 and the inner frames 208 when a mechanical clamping system (not shown) is used to secure the reactor cells 1102. In this manner, as illustrated in FIG. 11, the rigid isolators 1106 may utilize channels and/or ribs configured to interface with any ribs and/or channels of the terminal outer frames 202 and/or inner frames 208 of the assembled plurality of reactor cells 1102. Further, the isolators 1106 may be configured to provide electrical isolation of electrically active components and metallic end plates and/or damping system. Accordingly, the isolators 1106 may comprise a non-conductive material.

One or more input/output manifold fittings 1108 may be configured to interface with electrolyte inlet manifolds 504 or output manifolds of the outer frames 202 of the reactor cells 1102. External pumping mechanisms (not shown) may pump electrolyte solution into primary compartments of the reactor cells through the electrolyte inlet manifolds 504 of the outer frames 202 of the reactor cells 1102 via the input manifold fittings 1108. Similarly, electrolyte solution may be pumped from the primary compartments of the reactor cells through the electrolyte outlet manifolds of the outer frames 202 of the reactor cells 1102 via output manifold fittings 1108.

As discussed above in reference to FIG. 7 and FIG. 8, an inner o-ring (not shown) may be disposed in an inner o-ring channel 702 included in the outer frame 202 at a terminal end of the stack of reactor cells 1102. The inner o-ring may be configured to seal the terminal outer frame 202 of the stack of reactor cells 1102 (i.e., the top outer frame 202 of stack of reactor cells 1102 illustrated in FIG. 11) against an end plate 1104 and/or rigid isolator 1106. Similarly, an outer o-ring 1112 may be disposed in an outer o-ring channel 902 included in the outer frame 202 at the other terminal end of the stack of reactor cells 1102. The outer o-ring 1112 may be configured to seal the other terminal outer frame 202 of the stack of reactor cells 1102 (i.e., the bottom outer frame 202 of the stack of reactor cells 1102 illustrated in FIG. 11) against a end plate 1104 and/or rigid isolator 1106. In certain embodiments, the input/output manifold fittings 1108 may be also sealed against an outer frame 202 using an input/output manifold fitting o-ring 1114 as shown.

Figure 12:
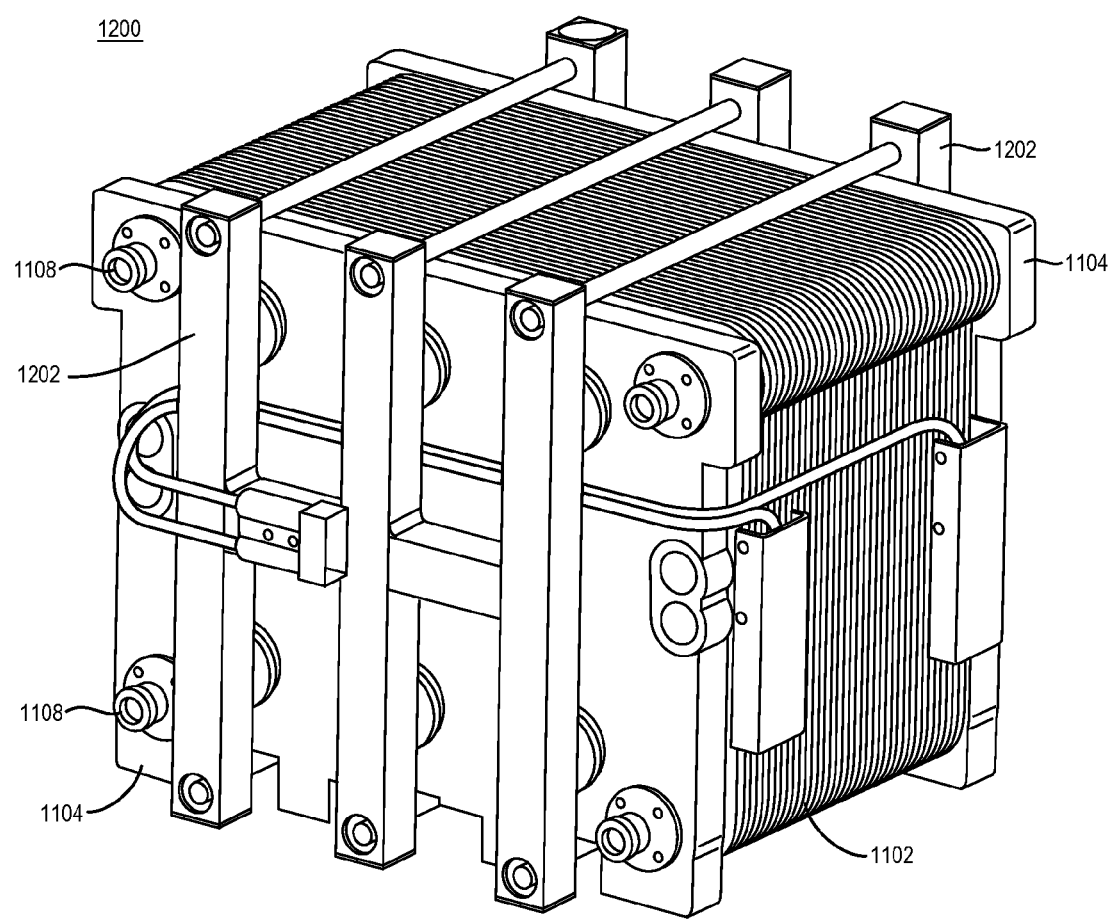
FIG. 12 illustrates a perspective view of an assembled flow cell battery including a plurality of reactor cells consistent with embodiments disclosed herein.

FIG. 12 illustrates a perspective view of an assembled flow cell battery 1200 including a plurality of reactor cells 1102 consistent with embodiments disclosed herein. As illustrated, the plurality of reactor cells 1102 may be secured together using a mechanical clamping system 1202. The mechanical clamping system 1202 may be configured to apply substantially uniform compression across the plurality of reactor cells 1102. In certain embodiments, end plates 1104 may be used in conjunction with the mechanical clamping system 1202 to apply uniform compression across the plurality of reactor cells 1102.

As illustrated, the mechanical clamping system 1202 may comprise rigid members disposed in parallel to the end plates 1104 on each side of the plurality of reactor cells 1102. The mechanical clamping system 1202 may further comprise cross members extending perpendicular to the plurality of reactor cells 1102. The cross members may be coupled to the rigid members disposed in parallel to the end plates 1104 on each side of the plurality of reactor cells 1102. Consistent with some embodiments, the cross members may be utilized to apply a compressive force between the rigid members and/or end plates 1104. In certain embodiments, the cross members may utilize a bolting, jackscrew, or similar mechanism to apply such a compressive force. Although the illustrated mechanical clamping system 1202 utilizes rigid members and cross members to apply a compressive force, any mechanical system configured to provide a compressive force to the plurality of reactor cells 1102 may be utilized in assembled flow cell battery 1200.

Figure 13:
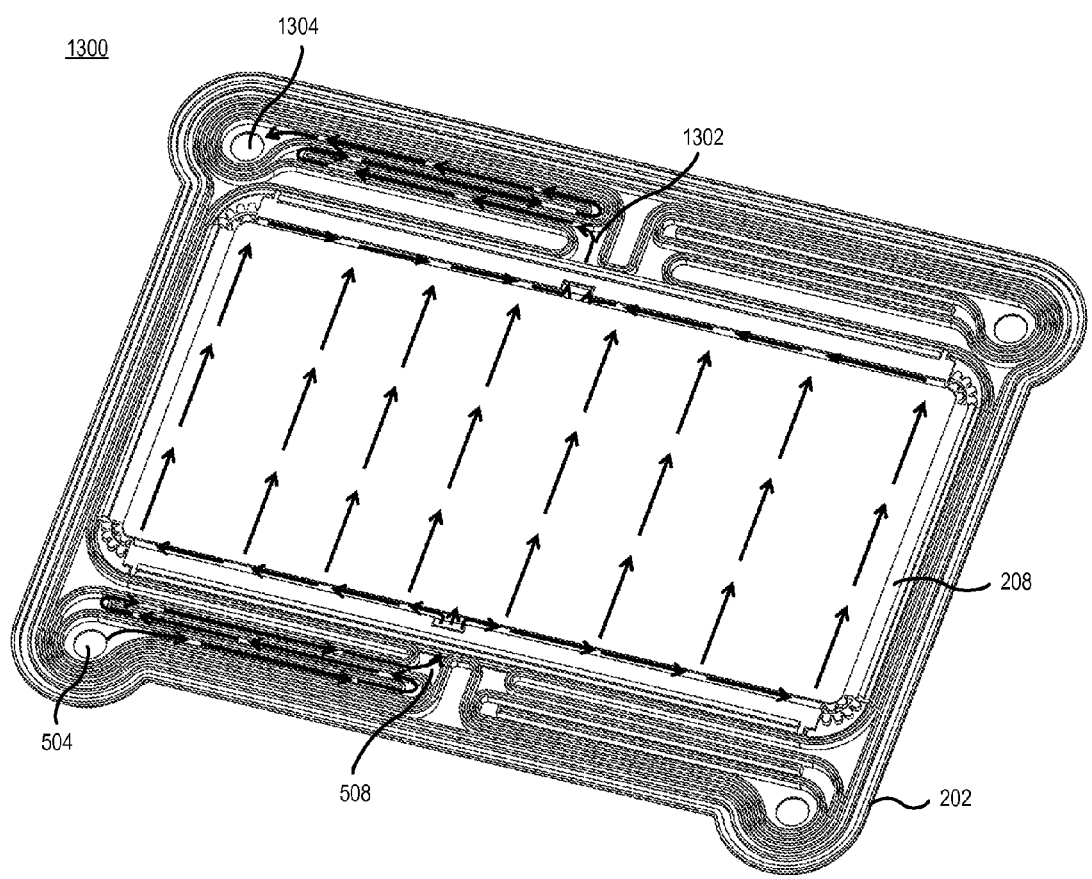
FIG. 13 illustrates a perspective view of the flow of negative electrolyte through a reactor stack cell consistent with embodiments disclosed herein.

FIG. 13 illustrates a perspective view 1300 of the flow of negative electrolyte through a reactor stack cell consistent with embodiments disclosed herein. As illustrated, electrolyte solution may be pumped into a primary compartment defined in part by outer frame 202 via an electrolyte inlet manifold 504. In certain embodiments, the electrolyte solution may be pumped into the primary compartment through a shunt channel, as described above in reference to FIG. 5, and enter the primary compartment via an inlet channel 508.

In some embodiments, feed channels integrated along the inner periphery of the outer frame 202 and/or the inner frame 208 defining the edges of the primary compartment may be configured to provide a more uniform flow of electrolyte solution through the primary compartment after entering from the inlet channel 508. Accordingly, as illustrated, electrolyte solution may be fed into the primary compartment via the inlet channel 508 and be distributed along an edge of the primary compartment by feed channels, thereby enabling a substantially uniform flow of the electrolyte solution through the primary compartment.

In certain circumstances, during operation of the redox flow battery energy storage system, electrolyte solution may tend to flow around the outer edges of the primary compartment rather than uniformly across the primary compartment. For example, under pumping pressures, electrolyte solution may tend to flow across the primary compartment through paths of lesser flow resistance such as the interface between the felt sheets 204 and the outer frames 202 and/or inner frames 208. To compensate for these effects, the felts sheets 204 may be sized slightly larger than the size of the primary compartment defined by the outer frames 202 and/or inner frames 208. For example, in certain embodiments, the felt sheets 204 may be cut slightly wide to tightly fit into a primary compartment. By compressing the "oversized" felt sheets 204 into the narrower compartment, the flow resistance along the edges of the primary compartment may be increased, thereby decreasing the tendency for electrolyte solution to flow more readily along the edges of the primary compartment.

Feed channels integrated along the inner periphery of the outer frame 202 and/or the inner frame 208 defining the edges of the primary compartment may be configured to collect electrolyte solution flowing through the primary compartment and direct the electrolyte solution to an outlet channel 1302. In certain embodiments, the electrolyte solution may then pass through a shunt channel and out of the reactor cell through an outlet manifold 1304.

Figure 14:
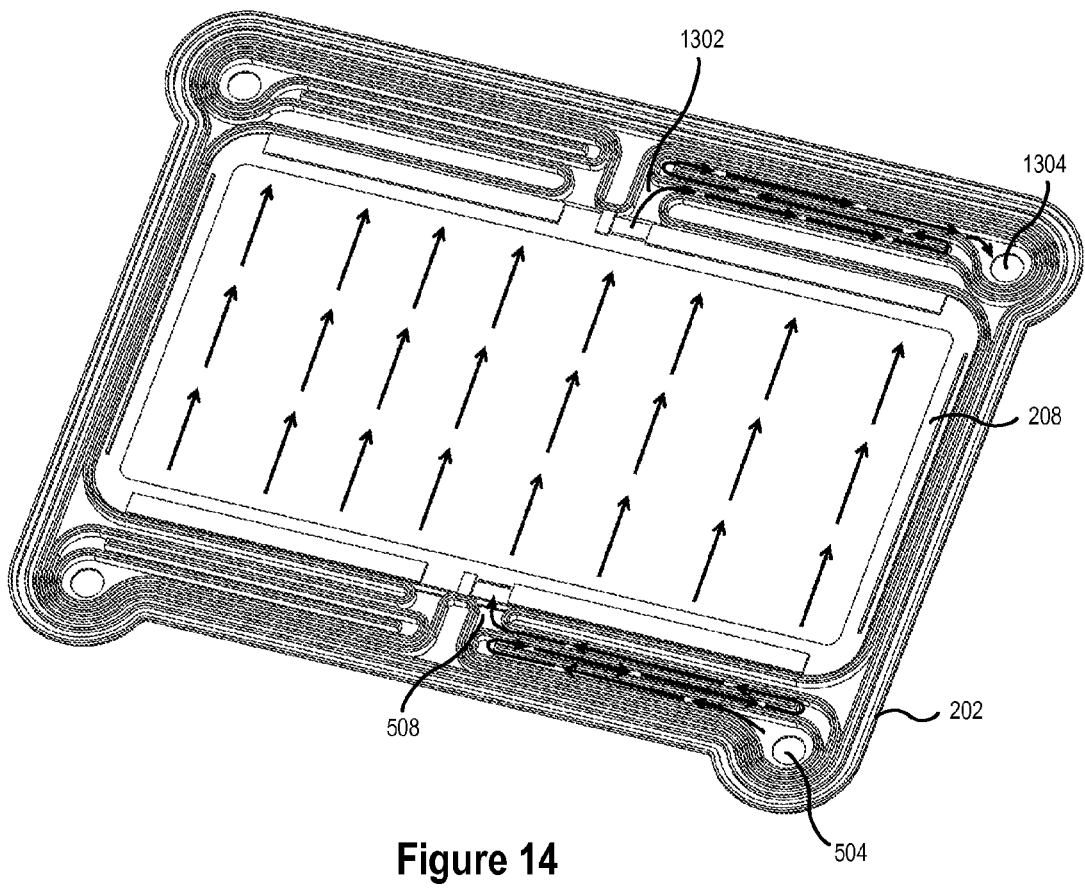
FIG. 14 illustrates a perspective view of the flow of positive electrolyte through a reactor stack cell consistent with embodiments disclosed herein.

FIG. 14 illustrates a perspective view 1400 of the flow of positive electrolyte through a reactor stack cell consistent with embodiments disclosed herein. The flow of positive electrolyte solution through a primary compartment may be similar to the flow of negative electrolyte solution through a primary compartment, as described above in reference to FIG. 13. As illustrated in FIG. 14, positive electrolyte solution may flow through a primary compartment via an inlet manifold 504, a shunt channel, an inlet channel, feed channels, an outlet channel 1302, another shunt channel, and an outlet manifold 1304. In some embodiments, the frame structures used in directing the flow of positive electrolyte solution may be disposed on the opposite side of the outer and/or inner frames 202, 208, than the frame structures used in directing the flow of negative electrolyte solution.

Figure 15:
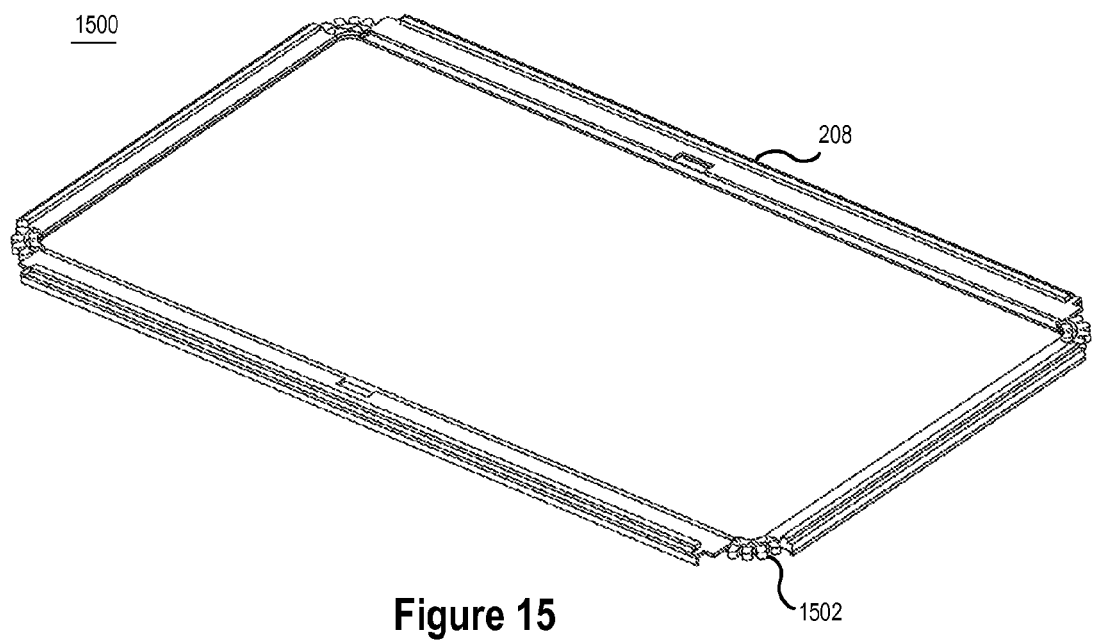
FIG. 15 illustrates an inner frame of a reactor stack cell including flexible corners consistent with embodiments disclosed herein.

FIG. 15 illustrates a perspective view 1500 of an inner frame 208 of a reactor stack cell including flexible corners 1502 consistent with embodiments disclosed herein. Due to minor dimensional variations of the outer frame 202 and/or inner frame 208 introduced during manufacturing, securing the inner frame 208 to the outer frame 202 may be difficult. Accordingly, the corners 1502 of the inner frame 208 may be configured to be flexible (i.e., less rigid than the sides of the inner frame 208), allowing the inner frame 208 to adapt to minor manufacturing variations of the inner frame 208 and/or the outer frame 202 when secured in the outer frame 202. In some embodiments, flexible corners 1502 of the inner frame 208 may be designed by integrating portions at the corners 1502 of the inner frame 208 that are thinner and/or less rigid than the sides of the inner frame 208. In certain embodiments, the inner frame 208 and/or outer frame 202 may be heated to increase the flexibility of the frames 208, 202 and allow for the frames to be securely coupled despite minor dimensional variations.

Figure 16:
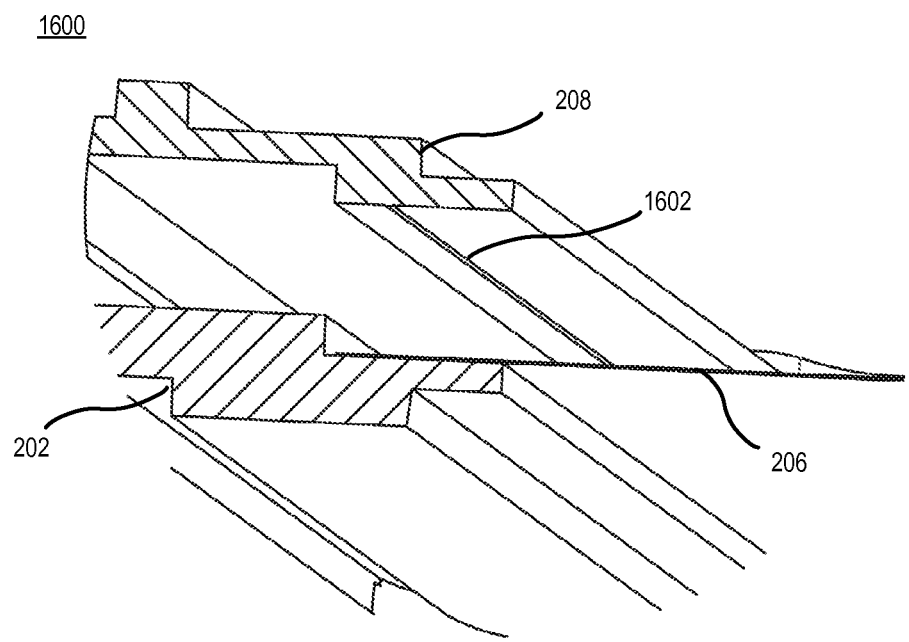
FIG. 16 illustrates a cross-sectional view of a membrane securing design for a reactor stack cell consistent with embodiments disclosed herein.

FIG. 16 illustrates a cross-sectional view 1600 of a membrane securing design for a reactor stack cell consistent with embodiments disclosed herein. As illustrated, the membrane 206 may be secured between the outer frame 202 and the inner frame 208. In certain embodiments, a raised rib 1602 integrated into the inner frame 208 and/or the outer frame 202 may be configured to press into the edges of membrane 206 when it is compressed between the outer frame 202 and the inner frame 208, thereby securing the membrane 206 between the outer frame 202 and the inner frame 208. In some embodiments, the raised rib 1602 may create a seal between the outer frame 202, the inner frame 208, and the edges of the membrane 206. In certain embodiments, the seal may be a low pressure seal capable of containing low or sub-kilopascal pressure differentials (e.g., 5 kPa or 15 kPa).

Figure 17:
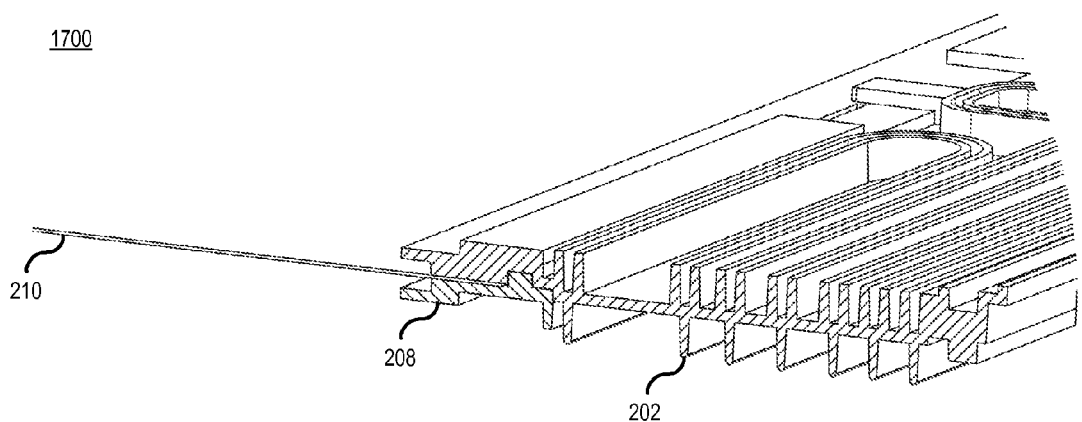
FIG. 17 illustrates a cross-sectional view of an electrode securing design for a reactor stack cell consistent with embodiments disclosed herein.

FIG. 17 illustrates a cross-sectional view 1700 of an electrode 210 securing design for a reactor stack cell consistent with embodiments disclosed herein. As illustrated, the electrode 210 may be secured between the outer frame 202 and the inner frame 208. In certain embodiments, a raised rib (not shown) integrated into the inner frame 208 and/or the outer frame 202 may be configured to press into the edges of electrode 210 when it is compressed between the outer frame 202 and the inner frame 208, thereby securing the electrode 210 between the outer frame 202 and the inner frame 208. In some embodiments, the raised rib may create a seal between the outer frame 202, the inner frame 208, and the edges of the electrode 210. In certain embodiments, the seal may be a low pressure seal capable of containing low or sub-kilopascal pressure differentials. In certain other embodiments, a sealant may be used between the interfaces of the outer frame 202, the inner frame 208, and the edges of the electrode 210 to create a seal.

Figure 18:
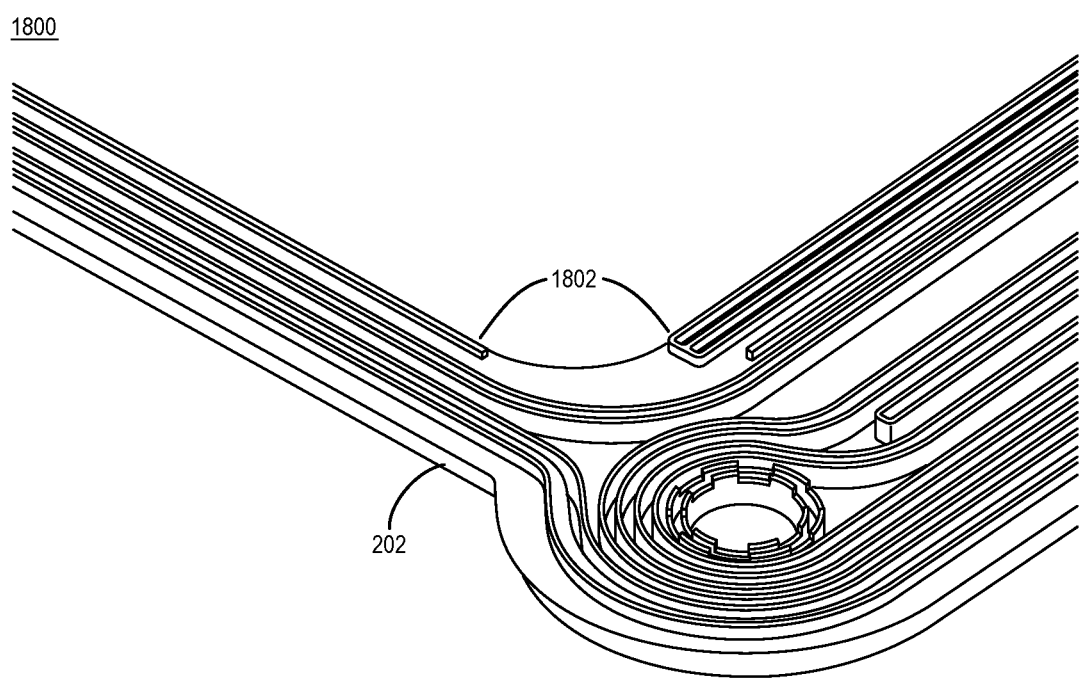
FIG. 18 illustrates a perspective view of an outer frame of a reactor stack cell including guides for positioning other reactor stack cell components consistent with embodiments disclosed herein.

FIG. 18 illustrates a perspective view 1800 of an outer frame 202 of a reactor stack cell including guides 1802 for positioning other reactor stack cell components consistent with embodiments disclosed herein. As shown, the outer frame 202 may include integrated guides 1802 configured to guide, align, and/or position components 202-210 of the reactor cell during assembly. The illustrated guides 1802, may be particularly configured to guide, align, and/or position the membrane 206 during assembly of the reactor cell stack. Utilizing guides 1802 may allow for a more efficient assembly of the reactor cell stack by reducing the likelihood of components 202-210 becoming unaligned which may potentially result in disassembly and realignment.

Figure 19:
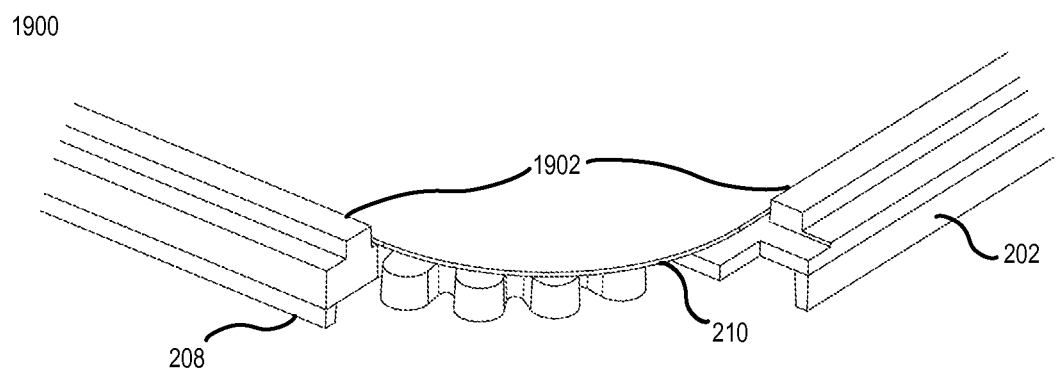
FIG. 19 illustrates a perspective view of an inner frame of a reactor stack cell including guides for positioning other reactor stack cell components consistent with embodiments disclosed herein.

FIG. 19 illustrates a perspective view 1900 of an inner frame 208 of a reactor stack cell including guides 1902 for positioning other reactor stack cell components consistent with embodiments disclosed herein. As shown, the inner frame 208 may include integrated guides 1902 configured to guide, align, and/or position components 202-210 of the reactor cell during assembly. The illustrated guides 1902 may be particularly configured to guide, align, and/or position the electrode 210 during assembly of the reactor cell stack. Utilizing guides 1902 may allow for a more efficient assembly of the reactor cell stack by reducing the likelihood of components 202-210 becoming unaligned which may potentially result in disassembly and realignment.

Figure 20:
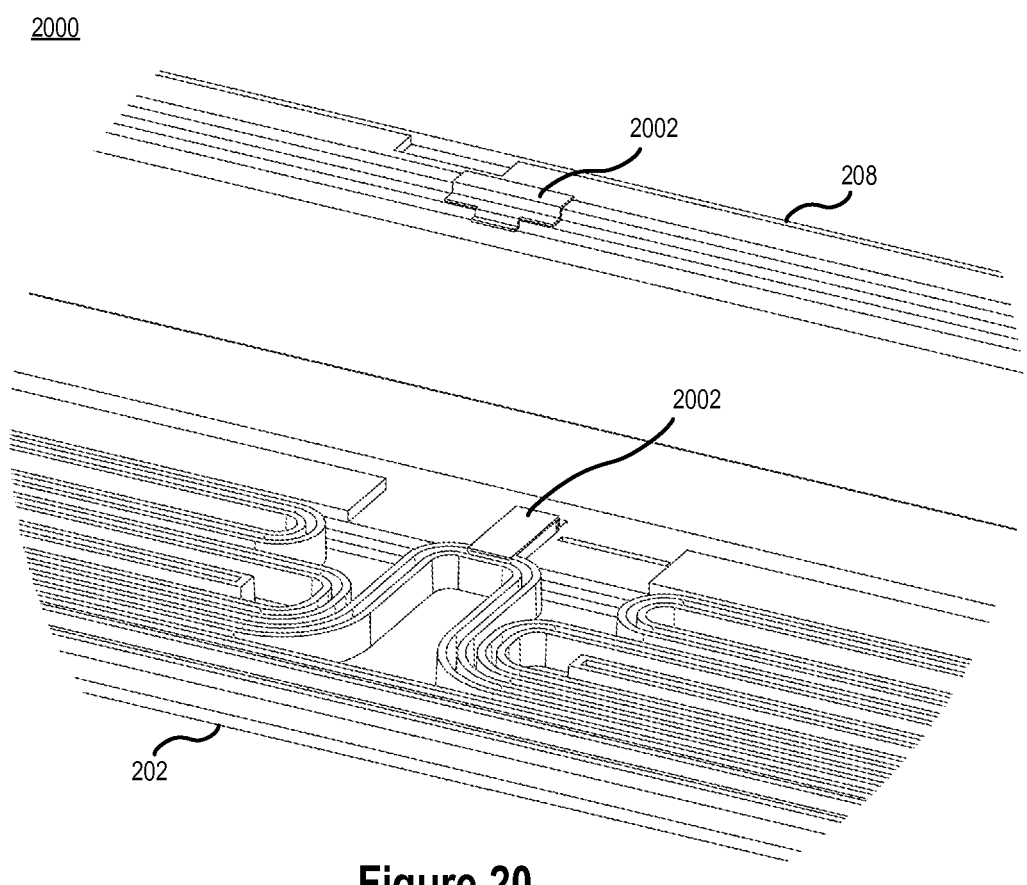
FIG. 20 illustrates a perspective view of a gasket system for sealing areas of a reactor stack cell consistent with embodiments disclosed herein.

FIG. 20 illustrates a perspective view 2000 of a gasket system 2002 for sealing areas of a reactor stack cell consistent with embodiments disclosed herein. As discussed above in reference to FIG. 13 and FIG. 15, the frame structures used in directing the flow of positive electrolyte solution may be disposed on the opposite side of the outer and/or inner frames 202, 208, than the frame structures used in directing the flow of negative electrolyte solution. In certain embodiments, gaskets 2002 (e.g., rubber gaskets or the like) configured to be secured onto the inner frame 208 and/or outer frame 202 may be utilized to direct the flow of electrolyte solution in conjunction with integrated frame structures. For example, as illustrated, gaskets 2002 may be utilized to create substantially impermeable seals between a positive electrolyte inlet channel and a negative electrolyte inlet channel defined in the outer frame 202 and/or the inner frame 208. In certain other embodiments, adhesive and/or non-adhesive sealants may be utilized to create similar seals without the use of discrete gaskets 2002.

Many changes may be made to the details of the above-described embodiments without departing from the underlying principles of this disclosure. The scope of the present invention should, therefore, be determined only by the following claims.

What is claimed is:

1. A redox flow battery system reactor assembly comprising:
   a plurality of outer frames;
   a plurality of inner frames; and
   a rib and channel interlock system integrated in the plurality of outer frames and the plurality of inner frames, the rib and channel interlock system configured to create a plurality of seal systems, each seal system enclosing an outer circumference of an electrolyte compartment when the plurality of outer frames and the plurality of inner frames are compressed together in a stack configuration,
   wherein each seal system comprises a primary seal and a secondary seal defined in part by the rib and channel interlock system, and
   wherein the secondary seal is a lower pressure seal than the primary seal.

2. The redox flow battery system reactor assembly of claim 1, wherein the plurality of outer frames and the plurality of inner frames are comprised of a polymer material.

3. The redox flow battery system reactor assembly of claim 1, wherein each seal system is configured to substantially confine electrolyte solution within the electrolyte compartment.

4. The redox flow battery system reactor assembly of claim 1, wherein the primary seal is a high pressure seal.

5. The redox flow battery system reactor assembly of claim 1, wherein the rib and channel interlock system comprises a plurality of sealing ribs and a plurality of channel ribs, wherein each sealing rib is configured to be disposed within a channel formed by a pair of channel ribs.

6. The redox flow battery system reactor assembly of claim 1, wherein the rib and channel interlock system is further configured to create structural frame portions using ribs and channels when the plurality of outer frames and the plurality of inner frames are compressed together in a stack configuration.

7. The redox flow battery system reactor assembly of claim 1, wherein the plurality of outer frames and the plurality of inner frames are comprised of an injection molded material.

8. The redox flow battery system reactor assembly of claim 7, wherein the plurality of outer frames and the plurality of inner frames are comprised of a material having a consistent wall thickness.

9. The redox flow battery system reactor assembly of claim 1, wherein the plurality of outer frames and the plurality of inner frames are comprised of a material that does not significantly degrade when exposed to electrolyte solution.

10. The redox flow battery system reactor assembly of claim 1, wherein each seal system includes a secondary compartment disposed between the primary seal and the secondary seal, the secondary compartment being configured to substantially capture any electrolyte solution that leaks through the primary seal.

11. A redox flow battery system reactor assembly comprising:
   a plurality of outer frames;
   a plurality of inner frames; and a rib and channel interlock system integrated in the plurality of outer frames and the plurality of inner frames, the rib and channel interlock system configured to create a plurality of seal systems, each seal system enclosing an outer circumference of an electrolyte compartment when the plurality of outer frames and the plurality of inner frames are compressed together in a stack configuration, wherein each seal system comprises a primary seal and a secondary seal defined in part by the rib and channel interlock system, and wherein each seal system includes a secondary compartment disposed between the primary seal and the secondary seal, the secondary compartment being configured to substantially capture any electrolyte solution that leaks through the primary seal.

12. The redox flow battery system reactor assembly of claim 11, wherein the secondary compartment is configured to be at an ambient air pressure.

13. The redox flow battery system reactor assembly of claim 11, wherein each seal system further includes an access port configured to access electrolyte solution captured in the secondary compartment.

14. The redox flow battery system reactor assembly of claim 11, wherein the plurality of outer frames and the plurality of inner frames are comprised of a polymer material.

15. The redox flow battery system reactor assembly of claim 11, wherein each seal system is configured to substantially confine electrolyte solution within the electrolyte compartment.

16. The redox flow battery system reactor assembly of claim 11, wherein the primary seal is a high pressure seal.

17. The redox flow battery system reactor assembly of claim 11, wherein the rib and channel interlock system comprises a plurality of sealing ribs and a plurality of channel ribs, wherein each sealing rib is configured to be disposed within a channel formed by a pair of channel ribs.

18. The redox flow battery system reactor assembly of claim 11, wherein the rib and channel interlock system is further configured to create structural frame portions using ribs and channels when the plurality of outer frames and the plurality of inner frames are compressed together in a stack configuration.

19. The redox flow battery system reactor assembly of claim 11, wherein the plurality of outer frames and the plurality of inner frames are comprised of an injection molded material.

20. The redox flow battery system reactor assembly of claim 11, wherein the plurality of outer frames and the plurality of inner frames are comprised of a material having a consistent wall thickness.

* * * * *